(12) United States Patent
Deforge et al.

(10) Patent No.: US 12,224,782 B2
(45) Date of Patent: Feb. 11, 2025

(54) DETECTION, CANCELLATION, AND EVALUATION OF SIGNALS IN A WIRELESS COMMUNICATION RADIO UNIT

(71) Applicant: Dell Products, L.P., Round Rock, TX (US)

(72) Inventors: John Bradley Deforge, Chelsea (CA); Danyi Rong, Ottawa (CA); Sewvanda Don, Ottawa (CA); Tommy Ivarsson, Ottawa (CA)

(73) Assignee: DELL PRODUCTS L.P., Round Rock, TX (US)

( * ) Notice: Subject to any disclaimer, the term of this patent is extended or adjusted under 35 U.S.C. 154(b) by 269 days.

(21) Appl. No.: 17/721,156

(22) Filed: Apr. 14, 2022

(65) Prior Publication Data
US 2023/0336196 A1 Oct. 19, 2023

(51) Int. Cl.
*H04W 8/24* (2009.01)
*H04B 1/04* (2006.01)

(52) U.S. Cl.
CPC ... *H04B 1/0475* (2013.01); *H04B 2001/0425* (2013.01)

(58) Field of Classification Search
CPC . H04B 1/04; H04B 1/0275; H04B 2001/0425
See application file for complete search history.

(56) References Cited

U.S. PATENT DOCUMENTS

| | | | |
|---|---|---|---|
| 5,311,190 A | 5/1994 | Devendorf et al. | |
| 8,565,343 B1 | 10/2013 | Husted et al. | |
| 9,252,831 B2 | 2/2016 | Rimini et al. | |
| 9,596,676 B2 | 3/2017 | Gotman | |
| 9,787,415 B2 | 10/2017 | Fan et al. | |

(Continued)

FOREIGN PATENT DOCUMENTS

| | | |
|---|---|---|
| EP | 2822189 | 1/2015 |
| EP | 3046260 | 7/2016 |
| EP | 3962008 | 3/2022 |

OTHER PUBLICATIONS

Invitation to Pay Additional fees mailed Apr. 17, 2023 for PCT Application No. PCT/US2022/053284, 12 pages.

(Continued)

*Primary Examiner* — Hai V Nguyen
(74) *Attorney, Agent, or Firm* — Amin, Turocy & Watson, LLP

(57) ABSTRACT

An error correction component and ΔTΘM function determine correction factors from a feedback signal to use by digital predistortion to cancel distortion caused by a power amplifier and also determine correction factors that may be used to determine Time of Arrival of an isolation leakage signal. Correction factors may be stored in, or retrieved from, multiple ΔTΘM functions, which may be part of an ASIC along with the error correction component. The isolation leakage signal may be canceled within the error correction component, resulting in a leakage residual signal that may facilitate determining the ToA of the leakage signal. Cancelling the isolation leakage signal facilitates better sensitivity in detecting the presence of, or ToA of, other signals present at the same port of a circulator from which the isolation leakage signal flows to the error correction component.

20 Claims, 13 Drawing Sheets

(56) References Cited

U.S. PATENT DOCUMENTS

| | | | |
|---|---|---|---|
| 10,218,490 B1* | 2/2019 | Yang | H04L 5/1461 |
| 10,333,764 B1 | 6/2019 | Arditti Ilitzky | |
| 10,649,067 B1* | 5/2020 | Yang | G01S 7/038 |
| 11,012,201 B2 | 5/2021 | Hormis et al. | |
| 11,329,689 B1* | 5/2022 | Rodenbeck | H04B 1/525 |
| 2004/0106380 A1 | 6/2004 | Vassiliou et al. | |
| 2006/0040620 A1 | 2/2006 | Jung et al. | |
| 2011/0200083 A1 | 8/2011 | Choi | |
| 2012/0281772 A1 | 11/2012 | Bailey et al. | |
| 2013/0107914 A1 | 5/2013 | Park et al. | |
| 2014/0269864 A1 | 9/2014 | Aparin | |
| 2014/0355714 A1 | 12/2014 | Cheng et al. | |
| 2015/0030102 A1 | 1/2015 | Hormis et al. | |
| 2015/0030103 A1 | 1/2015 | Hormis et al. | |
| 2015/0288461 A1* | 10/2015 | Barabash | H04B 17/103 455/115.1 |
| 2016/0094331 A1* | 3/2016 | White | H04L 5/14 370/278 |
| 2017/0153318 A1* | 6/2017 | Melzer | G01S 13/343 |
| 2018/0006795 A1 | 1/2018 | Raaf | |
| 2018/0054254 A1 | 2/2018 | Cederholm et al. | |
| 2019/0007078 A1* | 1/2019 | Tsui | H04B 1/0466 |
| 2019/0013181 A1* | 1/2019 | Nishiwaki | H01J 37/32082 |
| 2021/0055402 A1 | 2/2021 | Lin et al. | |
| 2021/0116501 A1 | 4/2021 | Martineau et al. | |
| 2022/0026520 A1* | 1/2022 | Han | H04B 1/525 |
| 2022/0029774 A1 | 1/2022 | Yuan et al. | |
| 2022/0224366 A1 | 7/2022 | Steigert et al. | |
| 2023/0006703 A1* | 1/2023 | Du | H03F 1/32 |
| 2023/0318639 A1* | 10/2023 | Deforge | H04B 1/0475 455/114.2 |
| 2024/0241214 A1* | 7/2024 | Wang | G01S 7/006 |

OTHER PUBLICATIONS

International Search Report and Written Opinion for PCT Application No. PCT/US2022/053284 mailed Jun. 7, 2023, 17 pages.
Invitation to Pay Additional fees mailed Apr. 17, 2023 for PCT Application No. PCT/US2022/053064, 13 pages.
Office Action mailed Jun. 8, 2023 for U.S. Appl. No. 17/660,353, 25 pages.
Rong, et al. "Analog Domain Loopback Modes" U.S. Appl. No. 17/660,353, filed Apr. 22, 2022, 48 pages.
Deforge, et al. "Detection and Cancellation of Unwanted Signals in a Wireless Communication Radio Unit" U.S. Appl. No. 17/710,824, filed Mar. 31, 2022, 75 pages.
International Search Report and Written Opinion for PCT Application No. PCT/US2022/053275 mailed May 2, 2023, 18 pages.
International Search Report and Written Opinion for PCT Application No. PCT/US2022/053064 mailed Jul. 5, 2023, 20 pages.
Office Action mailed May 22, 2024 for U.S. Appl. No. 17/710,824, 39 pages.
Office Action mailed Jan. 3, 2024 for U.S. Appl. No. 17/660,353, 41 pages.
Notice of Allowance mailed Mar. 15, 2024 for U.S. Appl. No. 17/660,353, 19 pages.
Notice Concerning Transmittal of International Preliminary Report on Patentability mailed Oct. 10, 2024 for PCT Application No. PCT/US2022/053064, 12 pages.
European Office Action mailed Nov. 8, 2024 for European Patent Application No. 22850827.1, 3 pages.
Notice Concerning Transmittal of International Preliminary Report on Patentability mailed Oct. 31, 2024 for PCT Application No. PCT/US2022/053284, 10 pages.
Office Action mailed Aug. 30, 2024 for U.S. Appl. No. 17/710,824, 23 pages.
Notice of Allowance mailed Sep. 13, 2024 for U.S. Appl. No. 17/710,824, 20 pages.
Notice Concerning Transmittal of International Preliminary Report on Patentability mailed Oct. 24, 2024 for PCT Application No. PCT/US2022/053275, 13 pages.
European Office Action mailed Nov. 21, 2024 for European Patent Application No. 22854479.7, 3 pages.
European Office Action mailed Nov. 29, 2024 for European Patent Application No. 22851204.2, 3 pages.

* cited by examiner

```
┌─────────────────────────────────────────────────────────────────────────┐
│ A first ΔTΘM function and a second ΔTΘM function, wherein the first signal correction factor is stored │
│ in a memory corresponding to the first ΔTΘM function and the second signal correction factor is │
│ stored in a memory corresponding to the second ΔTΘM function, wherein the error correction │
│ component processor is further to:                                      │
└─────────────────────────────────────────────────────────────────────────┘
                                    │
                                    ▼                                  1205
┌─────────────────────────────────────────────────────────────────────────┐
│ Retrieve the first and second signal correction factors from the first ΔTΘM function and the second │
│ ΔTΘM function, respectively, to determine the time of arrival of the isolation leakage signal based on │
│ the first signal correction factor and to determine the time of arrival of the second signal based on the │
│ second signal correction factor, respectively                           │
└─────────────────────────────────────────────────────────────────────────┘
                                    │
                                    ▼                                  1210
┌─────────────────────────────────────────────────────────────────────────┐
│ Wherein the second signal is a reflection signal and wherein a line fault caused the reflection signal at │
│ a line fault location that corresponds to the time of arrival of the residual second signal, wherein the │
│ error correction component processor is further to: determine the line fault location based on the time │
│ of arrival of the second signal                                         │
└─────────────────────────────────────────────────────────────────────────┘
                                    │
                                    ▼                                  1215
┌─────────────────────────────────────────────────────────────────────────┐
│ Wherein the second signal is a reflection signal and wherein a line fault caused the reflection signal at │
│ a line fault location that corresponds to the time of arrival of the residual second signal, wherein the │
│ error correction component processor is further to: determine the line fault location based on the time │
│ of arrival of the second signal and determine the nature of the fault based on an amplitude of the │
│ second signal that corresponds to the second signal correction factor.  │
└─────────────────────────────────────────────────────────────────────────┘
                                                                       1220
```

FIG. 12    1200

```
┌─────────────────────────────────────────────────────────────────────────┐
│ Wherein the transmit signal correction factor is stored in a memory corresponding to a first ΔTΘM │
│ function, wherein the isolation leakage signal correction factor is stored in a memory corresponding to │
│ a second error ΔTΘM function, and wherein the reflection signal correction factor is stored in a │
│ memory corresponding to a third ΔTΘM function │
└─────────────────────────────────────────────────────────────────────────┘
                                    ↓                                  1305
┌─────────────────────────────────────────────────────────────────────────┐
│ Evaluating the reflection signal correction factors stored in the memory corresponding to the third │
│ ΔTΘM function │
└─────────────────────────────────────────────────────────────────────────┘
                                    ↓                                  1310
┌─────────────────────────────────────────────────────────────────────────┐
│ Determining a time of arrival of the reflection signal based on the evaluation of the reflection signal │
│ correction factor; and │
└─────────────────────────────────────────────────────────────────────────┘
                                    ↓                                  1315
┌─────────────────────────────────────────────────────────────────────────┐
│ Determining a characteristic corresponding to the reflection signal based on the reflection signal │
│ correction factor │
└─────────────────────────────────────────────────────────────────────────┘
                                    ↓                                  1320
┌─────────────────────────────────────────────────────────────────────────┐
│ Wherein the reflection signal correction factor is used to determine a time of arrival of the reflection │
│ signal, the reflection signal time of arrival being used to determine the characteristic corresponding to │
│ the reflection signal that is a location of a fault corresponding to a waveguide that couples the non- │
│ reciprocal signal routing component and an antenna │
└─────────────────────────────────────────────────────────────────────────┘
                                                                       1325
```

FIG. 13    <u>1300</u>

DETECTION, CANCELLATION, AND EVALUATION OF SIGNALS IN A WIRELESS COMMUNICATION RADIO UNIT

BACKGROUND

In modern cellular systems and radio deployments energy consumption, radio performance, remote radio control, and ability to manage, and automate management of, the network are areas where improvements typically facilitate reduced operation costs. Improvements in design of radio systems, hardware, firmware, and software typically result in improvements in deployment and operation cost and performance. Therefore, it is desirable to improve design features in the areas of radio size, weight, thermal dissipation, reliability, and complexity.

Wireless Mobile Network Operators ("MNO"), which may be referred to herein as a wireless Service Provider ("WSP") typically own and operate much of the equipment that facilitates a wireless communication network, such as a cellular data network. Multiple vendors offer for sale the equipment that MNOs use in their networks. Often, compatibility problems arise when an MNO tries to use one component from one vendor with another component from another vendor.

An Open Radio Access Network ("O-RAN") refers to an evolution of Radio Access Network ("RAN") architecture where software and hardware specification are created in an open fashion such that various vendors, academics, and wireless industry operators contribute to a specification used by equipment vendors and operators. A seminal O-RAN specification is the technical specification TS 38.401 introduce by the 3rd generation Project Partnership ("3GPP").

A feature of O-RAN put forth in TS 38.401 is the splitting of the Baseband Unit ("BBU") in conventional (i.e., 4G and earlier) wireless networking infrastructure into a Distributed Unit ("DU") and a Central Unit ("CU"). The CU can be deconstructed into separate control plane ("CU-CP") and user plane ("CU-UP") functions. By replacing a single BBU with separate CU and DU components and functions can provide benefits such as centralized packet processing functions while separating baseband functions from the RU. An RU communicates with a DU via a fronthaul interface.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example method may comprise switching, or changing, the configuration of, a signal path selection component, which may comprise a first switch, of a device, the signal path selection component having a first input coupled to a transmit coupler of a radio unit and an output, which may be referred to as a first output, coupled to an input of an error correction component of the radio unit, (the input of the error correction component may be referred to as a third input) between at least providing a transmit signal from the coupler to the error correction component or providing leakage signal from an non-reciprocal signal routing component to the error correction component corresponding to the signal path selection component being configured according to a first configuration or being configured according to a second configuration, respectively. The signal path selection component may comprise a second switch that may have an output, which may be referred to as a second output, and an input, which may be referred to as a second input, coupled to a non-reciprocal signal routing component of the radio unit. If the signal path selection component includes a second switch, the second output may be coupled to the fourth input.

In an embodiment, the method may further comprise determining a transmit signal correction factor, or factors, based on a first error compensation function, which may be referred to as a $\Delta T\Theta M$ compensation function, or merely as a $\Delta T\Theta M$ function. The transmit signal correction factor(s) may be usable during the first configuration of the first switch that provides the transmit signal from the coupler to the error correction component. The embodiment may further comprise applying the transmit signal correction factor(s) to an input signal of the radio unit via the error correction component.

In an embodiment the method may further comprise determining a leakage signal correction factor, or factors, based on the first error compensation function, which may be usable during the second configuration of the first switch that provides the leakage signal from the non-reciprocal signal routing component to the error correction component; and applying the leakage signal correction factor(s), or by applying a signal from the first error compensation function that has been adjusted by the leakage signal correction factor(s), to the leakage signal within the error correction component without applying the leakage signal correction factor(s) to an input signal of the radio unit. The leakage signal may be a signal that leaks through an isolator, a circulator, or a duplexer.

In an embodiment, the method may further comprise determining time of arrival of a leakage residual signal that remains after the leakage signal correction factor(s) has/have been applied, or a signal from the first error compensation function that has been adjusted by the leakage signal correction factors has been applied, to the leakage signal within the error correction component.

In an embodiment, the error correction component performs an adaptation and correlation function/operation, or other mathematical function, or operation, such as addition or subtraction, to determine error correction factors. The error correction component may manage, control, or otherwise cooperate with a $\Delta T\Theta M$ compensation function, a $\Delta T\Theta M$ function, or merely a compensation function, which may comprise a function that changes time, phase, or magnitude of a provided signal e.g., time delay, phase shift, magnitude matching, of a signal, to determine error correction factors. The abbreviation "$\Delta T\Theta M$" may refer to "Difference in Time, Phase, or Magnitude." A $\Delta T\Theta M$ function may be controlled by an error correction component such that the $\Delta T\Theta M$ function adjusts a signal that is provided to it, for example from a CFR function, and provides an adjusted output of the signal provided to it to the error correction component in response to a control signal, or signals, from the error correction component. The error correction component may apply error correction factors, or a signal that has been adjusted by the $\Delta T\Theta M$ compensation function, by performing a correlation function between a signal received from the $\Delta T\Theta M$ compensation function and a signal to be corrected, attenuated, or otherwise compensated for, for example a leakage signal.

In an embodiment the leakage signal correction factor is applied when the signal path selection component is configured according to the second configuration that provides the leakage signal to the error correction component. Applying the leakage signal correction factor, or factors, may comprise determining, in cooperation with a ΔTΘM compensation function, within an error correction component correction factors that could cancel the leakage signal but that are not actually used to inject a leakage correction signal into an input signal for transmission. Rather, the leakage signal correction factors, or a signal from a ΔTΘM compensation function that has been adjusted according to the correction factors, may be used within the error correction component to substantially reduce, within the error correction component, the leakage signal to a leakage residual signal. A Time of Arrival of the leakage signal may be determined from error correction factors that resulted in reducing the leakage signal to a magnitude that is less than a residual leakage signal criteria, such as a predetermined amplitude limit. The time of arrival of the leakage signal, or a time of arrival of the residual leakage signal, which should be the same or about the same as the actual leakage signal, can be used to establish a time reference for signals received at a port of a non-reciprocal signal routing component, such as a circulator for example, coupled to an antenna used for facilitating the receiving and transmitting of RF signals.

In an embodiment, the signal path selection component, which may comprise a first switch, may comprise a first input coupled to a transmit coupler of radio unit, a second input, and a first output coupled to a third input of an error correction component of the radio unit. In this embodiment, the signal path selection component has two inputs—the third input is part of an error correction component, which may comprise an adaptation/correlation/mathematical function, or which may be configured to perform an adaptation/correlation/mathematical function. A second input of the signal path selection component may be coupled to a non-reciprocal signal routing component of the radio unit. In an embodiment where the signal path selection component comprises one or more hardware switches, a second output of the second switch is coupled to the fourth input of the first switch. The signal path selection component may be configured to switch, or change, between at least outputting a transmit signal from the coupler to the error correction component or outputting a leakage signal from the non-reciprocal signal routing component to the error correction component corresponding to being configured in a corresponding first configuration or being configured in a second configuration, respectively.

In an embodiment, the system may further comprise logic circuitry configured to determine one or more transmit signal correction factors during the first configuration that outputs the transmit signal from the coupler to the error correction component and to apply the one or more transmit signal correction factors to an input signal of the radio unit by the error correction component. During this first configuration the error correction function, or error correction component, may determine correction factors to apply to an input signal to correct for distortion caused by nonlinear operation of a power amplifier of the radio unit.

In an embodiment, the system further comprises logic circuitry configured to determine one or more leakage signal correction signal factors during the second configuration that outputs the leakage signal from the non-reciprocal signal routing component to the error correction component, and to apply the one or more leakage signal correction factors within the error correction component. The applying of the leakage signal correction factors may comprise cancelling the leakage signal, at least within the error correction component. Since no cancellation operation can completely cancel a signal, applying the leakage signal correction factors typically leaves a leakage signal residual signal, which may have the same time of arrival at the error correction function, or error correction component, as the leakage signal because its amplitude was substantially canceled but not completely cancelled and because the signal path selection component may not introduce phase shift or time delay of the leakage signal, and may only attenuate the leakage signal by applying an inverted image of the leakage signal within the error correction component. Put another way, the logic circuitry determines a time-delayed and phase-delayed signal, or one or more error correction factors that correspond to a time-delayed and phase-delayed signal, that is subsequently matched in amplitude (or signal level) and then inverted and added to (in essence subtracted from) the incident leakage signal in the error correction component. The error correction component, or function, may evaluate the residual leakage signal and correction factors that are determined to correspond thereto, and determine time of arrival of the residual signal therefrom. In other words, the leakage signal error correction factors may correspond to, or may be, factors that describe, or may be used in an algorithm within the ΔTΘM compensation function or within the error correction component to mathematically model, an image of the leakage signal, such that an inverted version of the image would attenuate, or substantially eliminate, the leakage signal.

In an embodiment, the system may further comprise logic, which may be embodied in circuitry, configured to determine one or more transmit signal correction factors during the first configuration that outputs the transmit signal from the coupler to the error correction component. These error correction factors may be factors that are used to create a signal, or to create values to provide to digital predistortion functionality, to cancel distortion caused by a power amplifier of the radio unit. The system may apply the transmit signal correction factors with digital predistortion functionality to an input signal of the radio unit, or the system may apply the transmit signal correction factors with the error correction component. The system may determine one or more leakage signal correction factors during the second configuration of the signal path selection component that outputs, or provide, or routes, the leakage signal from the non-reciprocal signal routing component to the error correction component. The isolation signal may be a leakage signal that 'leaks' through the non-reciprocal signal routing component, such as a circulator, to a port that ideally only provides signals received from an antenna coupled to a common port of the circulator for transmitting and receiving. The system may apply the one or more leakage signal correction factors, or a signal that has been adjusted according to the leakage signal correction factors, to the input signal within the error correction component without applying the leakage signal correction factors to the input signal. In an aspect, the applying of the leakage signal correction factors may be thought of as determining correction factors that would cancel the leakage signal from the input signal, but the correction factors, or a correction signal, is not actually applied to an input signal by a predistortion function. The applying and determining of the leakage signal correction factors may occur within the error correction component and is not used to alter the transmit signal transmitted from the radio unit. The logic circuitry may further comprise ΔTΘM compensation circuitry comprising one or more registers for storage of the one or more transmit signal correction factors or the one or more leakage signal correction factors.

In an embodiment, the error correction component comprises a processor portion of an application specific integrated circuit ("ASIC"). In an embodiment, the ASIC may include circuitry for one or more ΔTΘM compensation functions.

In another embodiment circuitry for one more or ΔTΘM compensation functions, or blocks, may be made from FPGA logic circuitry.

In yet another embodiment a method comprises determining, by a radio unit of a communication network, one or more transmit signal correction factors during operation of a first configuration of a signal path selection component that outputs one or more transmit signals from a coupler to an error correction component; applying the one or more transmit signal correction factors, or applying a signal adjusted according thereto, to an input signal of the radio unit by the error correction component; determining one or more isolation signal correction factors during operation of a second configuration of the signal path selection component that outputs a leakage signal from a non-reciprocal signal routing component to the error correction component; and applying the one or more leakage signal correction factors, or applying a signal adjusted according thereto, within the error correction component without applying the leakage signal correction factors to the input signal. In an aspect, the transmit signal correction factors may cancel, or substantially cancel, distortion caused by nonlinear operation of one or more power amplifiers of a radio unit while in contrast the leakage signal correction factors are not used to alter a transmit signal transmitted from the radio unit.

The leakage signal may represent leakage of the one or more transmit signals from a non-reciprocal signal routing component, which may comprise a circulator, and wherein the applying the one or more leakage signal correction factors, or applying a signal adjusted according thereto, occurs within the error correction component. Leakage through the circulator may be referred to as an isolation signal, due to the leakage being part of, or a portion or, signal energy that the circulator failed to isolate from a port thereof that provide receive signals from an antenna to receive circuitry of the radio unit.

In an embodiment, the method may further comprise receiving, via a first input of the signal path selection component, the one or more transmit signals from a coupler of the radio unit that receives the one or more transmit signals from an output of a power amplifier of the radio unit.

In an embodiment, the method may further comprise receiving, via a second input of the signal path selection component, the isolation signal from an isolator of the radio unit. The isolation signal may be a leakage signal that 'leaks' through an isolator, which may be a circulator.

In an embodiment the leakage residual signal may be evaluated within the error correction component to determine a Time of Arrival. The time of arrival of the leakage residual signal may be determined relative to the time of the generating of the input signal, or the providing of the input signal to a power amplifier of the radio unit.

In an embodiment, the leakage residual signal may be evaluated within the error correction component to determine a Time of Arrival of the leakage residual signal relative to the time of generating of the input signal; wherein the leakage signal represents leakage of the one or more transmit signals from a circulator, and wherein the applying the one or more leakage signal correction factors, or applying a signal adjusted according thereto, occurs within the error correction component leakage residual signal. The method may further comprise determining a degradation of the non-reciprocal signal routing component based on the Time of Arrival of the leakage residual signal relative to the time of generating of the input signal.

In another exemplary embodiment, a method comprises determining, by using an error correction component, or by a ΔTΘM compensation function used under control of the error correction component, of a radio unit of a communication network and comprising a processor, one or more first signal correction factors based on an isolation leakage signal output during operation of a second configuration of a signal path selection component that outputs the isolation leakage signal from a non-reciprocal signal routing component to the error correction component.

The method may comprise the error correction component generating a residual isolation leakage signal based on the first signal correction factors; determining a time of arrival of the isolation leakage signal based on the first signal correction factors; determining one or more second signal correction factors based on a second signal output during operation of the second configuration of the signal path selection component that outputs the second signal from the non-reciprocal signal routing component to the error correction component; generating a residual signal based on the second signal correction factors; and determining a time of arrival of the second signal based on the second signal correction factors.

The non-reciprocal signal routing component may comprise a circulator and the isolation leakage signal may be an isolation leakage signal that is a portion of a transmit signal that 'leaks' through the circulator to a receive path of the radio instead of being isolated from the receive path.

An embodiment may further comprise applying the first signal correction factors, or applying a signal adjusted according thereto, within the error correction component without applying the first signal correction factors to a signal to be transmitted by the radio unit, the isolation leakage signal comprises leakage of a transmit signal through the non-reciprocal signal routing component, and the applying the one or more first signal correction factors, or applying a signal adjusted according thereto, within the error correction component may create a residual isolation leakage signal. The residual isolation signal may be a mathematical representation of a signal and may be represented by the first signal correction factors, which may be factors that would represent, or that could be used to generate, an inverse of the isolation leakage signal. The residual isolation leakage signal may be evaluated within the error correction component to determine a Time of Arrival ("ToA") of the isolation leakage signal. The ToA of the isolation leakage signal and a ToA of the residual isolation leakage signal may coincide or may be substantially the same.

In an embodiment the determining of the time of arrival of the isolation leakage signal based on the first signal correction factors and the determining of the time of arrival of the second signal based on the second signal correction factors may comprise determining the time of arrival of the residual isolation leakage signal and determining the time of arrival of the residual second signal, respectively, wherein the second signal is a reflection signal, and wherein a line fault that caused the reflection signal corresponds to the time of arrival of the residual second signal relative to the time of arrival of the residual isolation leakage signal. The ToA of the second signal may be used to calculate a distance from the circulator, or other non-reciprocal signal routing component, to the line fault. Such determination may be made by evaluating a different between a ToA of the residual isolation signal and a ToA of the residual reflection signal. An embodiment may further comprise receiving, via the signal path selection component, the isolation leakage signal from the non-reciprocal signal routing component. In an embodiment, a $\Delta T\Theta M$ compensation function, applying a AM compensation function (e.g., applying a magnitude determining (e.g., magnitude matching) function but not determining or applying a delay in time or a shift in phase), may determine an amplitude of a VSWR signal that results from a reflection.

In an embodiment, the isolation leakage signal may comprise leakage of a transmit signal through the non-reciprocal signal routing component, wherein the first signal correction factors are applied within the error correction component to generate the residual isolation leakage signal; the method may further comprise: evaluating the residual isolation leakage signal within the error correction component to determine the Time of Arrival of the residual isolation leakage signal relative to a time of transmitting the transmit from the non-reciprocal signal routing component.

In another exemplary embodiment, a system comprises an error correction component of a radio unit of a communication network that comprises a processor that may be configured to determine, in cooperation with a first $\Delta T\Theta M$ compensation function, a first signal correction factor, or factors, based on an isolation leakage signal that is output during operation of a second configuration of a signal path selection component that outputs the isolation leakage signal from a non-reciprocal signal routing component to the error correction component. The processor of the error correction component may be configured to generate a residual isolation leakage signal based on the first signal correction factor, or factors, determine a time of arrival of the isolation leakage signal based on the first signal correction factor, or factors; determine, in cooperation with a second $\Delta T\Theta M$ compensation function, a second signal correction factor, or factors, based on a second signal output during operation of the second configuration of the signal path selection component that outputs the second signal from the non-reciprocal signal routing component to the error correction component; generate a residual second signal based on the second signal correction factor, or factors; and determine a time of arrival of the second signal based on the second signal correction factor, or factors. The residual isolation leakage signal and the residual reflection signal may be determined by the error correction component applying time-delayed, inverse versions (that may be based on respective correction factors) of the isolation leakage signal and the reflection signal, respectively, or by applying inverse versions (that may be based on respective correction factors) of the isolation leakage and reflection signals, to time-delayed versions of the isolation leakage and reflection signals, respectively. The time of arrival of the isolation leakage and reflection signals may be determined based on respective amounts of time (e.g., time-delay made with respect to determining the respective residual signals) that resulted in their respective real and imaginary parts being substantially attenuated. A time delay may be used perform an initial determination of a isolation compensation signal (e.g., a signal that when applied to the isolation leakage signal would cancel the isolation leakage signal). Using change in phase determining and magnitude matching functionality of a $\Delta T\Theta M$ compensation function may increase precision of the initial determination by taking advantage of the $\Delta \Theta$ (change in phase) and AM (magnitude matching)

functionality wherein the precision of the determining of ToA of the isolation leakage is augmented beyond just applying $\Delta T$ (time delay) that may be limited to a time change no smaller than a period of a signal's wavelength, but to include also the precision of additional time delay calculated from the phase delay function $\Delta \Theta$, which may provide for time delay precision better than (i.e., shorter period) than a signal's wavelength. In other words, using a time delay to determine a ToA of a isolation leakage signal is akin to a coarse tuning/determination and further using phase delay is akin to a fine tuning/determination of the ToA of the isolation leakage signal.

The system component may further comprise a first $\Delta T\Theta M$ function and a second $\Delta T\Theta M$ function, wherein the first signal correction factor is stored in a memory corresponding to the first $\Delta T\Theta M$ function and the second signal correction factor is stored in a memory corresponding to the second $\Delta T\Theta M$ function, wherein the error correction component processor is further to: retrieve, or obtain, the first and second signal correction factors, or signals adjusted according thereto, from the first $\Delta T\Theta M$ function and the second $\Delta T\Theta M$ function, respectively, to determine the time of arrival of the isolation leakage signal based on the first signal correction factor and to determine the time of arrival of the second signal based on the second signal correction factor, respectively. A $\Delta T\Theta M$ function or functionality may be implemented in firmware, circuitry, software, on an ASIC, with gates, may include, or be associated with, a memory portion, and may be discreet from, or part of, the error correction component.

In an embodiment, the second signal may be a reflection signal and a line fault may have caused the reflection signal at a line fault location that corresponds to the time of arrival of the residual second signal, wherein the error correction component processor is further to: determine the line fault location based on the time of arrival of the second signal. In other words, the location of the line fault may affect the ToA of the second signal, or of the residual second signal. Typically, the farther the line fault from the non-reciprocal signal routing component the later the ToA of the second signal relative to the ToA of the isolation leakage signal.

In an embodiment, the second signal may be a reflection signal and a line fault may have caused the reflection signal at a line fault location that corresponds to the time of arrival of the residual second signal, wherein the error correction component processor is further to: determine the line fault location based on the time of arrival of the second signal and determine the nature of the fault based on an amplitude of the second signal that corresponds to the second signal correction factor.

In an embodiment the signal path selection component comprises a first switch and a second switch, wherein the first switch comprises a first input and a first output that provides signals to be provided to a third input of the error correction component, and wherein the second switch comprises a second input and a second output that couples to a fourth input of the first switch.

In an embodiment, the error correction component processor may be further configured to: determine a transmit signal correction factor, or factors, based on a first error compensation function, which may be usable during a first configuration of the signal path selection component that provides a transmit signal from the coupler to the error correction component; apply the transmit signal correction factor to an input signal of the radio unit; determine the first signal correction factor, or factors, based on a second error compensation function, which may be usable during the second configuration of the signal path selection component that provides the isolation leakage signal from the non-reciprocal signal routing component to the error correction component; apply the first signal correction factor, or factors, or apply a signal adjusted according thereto, to the isolation leakage signal within the error correction component without applying the first signal correction factor, or factors, to an input signal of the radio unit; and determine a time of arrival of a residual second signal that remains after the first signal correction factor has been applied to the isolation leakage signal within the error correction component.

In yet another exemplary embodiment, a method comprises determining, by an error correction component of a radio unit of a communication network and comprising a processor, a transmit signal correction factor, or factors, during operation of a first configuration of a signal path selection component that provides a transmit signal from a coupler of the radio unit to the error correction component; applying the transmit signal correction factor, or factors, or a signal adjusted according thereto, to an input signal of the radio unit by the error correction component; determining, in cooperation with a $\Delta T\Theta M$ function, an isolation leakage signal correction factor during operation of a second configuration of the signal path selection component that provides an isolation leakage signal from a non-reciprocal signal routing component to the error correction component; applying the isolation leakage signal correction factor, or factors, or applying a signal adjusted according thereto, to the isolation leakage signal within the error correction component to produce a residual isolation leakage signal within the error correction component; determining, in cooperation with a $\Delta T\Theta M$ function, a reflection signal correction factor, or factors, during the operation of the second configuration of the signal path selection component that provides a reflection signal from the non-reciprocal signal routing component to the error correction component; and applying the reflection signal correction factor, or factors, or a signal adjusted according thereto, to the reflection signal within the error correction component to produce a residual reflection signal within the error correction component.

The transmit signal correction factor, or factors, may be stored in a memory corresponding to a first $\Delta T\Theta M$ function, wherein the isolation leakage signal correction factor, or factors, is stored in a memory corresponding to a second error $\Delta T\Theta M$ function, and wherein the reflection signal correction factor, or factors, is/are stored in a memory corresponding to a third $\Delta T\Theta M$ function. In another embodiment, the transmit signal correction factors that may have been determined by a first $\Delta T\Theta M$ function may be determined and then stored in a DPD function/DPD block of a radio unit for application of the transmit correction factors by the DPD function to cancel distortion cause by non-linear operation of a power amplifier of the radio unit. Such storing of the transmit signal correction factors to the DPD may free up the first $\Delta T\Theta M$ function to be used for another purpose, such as determining the isolation leakage signal correction factors under control of the error correction component. This leverages the functionality of the $\Delta T\Theta M$ function, which may conventionally be used to determine accurate transmit signal correction factors to a high precision for correcting for power amplifier distortion, to determine the isolation leakage correction factors to the same precision that the transmit signal correction factors were determined, thus facilitating the determining of a ToA of the isolation leakage signal, or of the corresponding residual isolation leakage signal, to a similar level of precision and accuracy. In similar fashion a $\Delta T\Theta M$ function different from the $\Delta T\Theta M$ function that may have been used to determine the transmit signal correction factors may be used to determine with a high level or accuracy and precision reflection signal correction factors.

The method embodiment may further comprise evaluating the reflection signal correction factor, or factors stored in the memory corresponding to the third $\Delta T\Theta M$ function (or second $\Delta T\Theta M$ function if the first $\Delta T\Theta M$ function was used to determine transmit signal correction factors and was then freed up, by providing the determined transmit signal correction factors to a DPD function, and used to determine the isolation leakage correction factors), determining a time of arrival of the reflection signal based on the evaluation of the reflection signal correction factor, or factors, and determining a characteristic corresponding to the reflection signal based on the evaluating of the reflection signal correction factor, or factors.

The reflection signal may be a voltage standing wave ratio signal. In an embodiment, the reflection signal correction factor may be used to determine a time of arrival of the reflection signal, and the reflection signal time of arrival may be used to determine the characteristic corresponding to the reflection signal, which characteristic may be a location of a fault corresponding to a waveguide that couples the non-reciprocal signal routing component and an antenna. The reflection signal correction factor may be used to determine a time of arrival and an amplitude of the reflection signal, which may be a VSWR signal, and the reflection signal time of arrival and amplitude may be used to determine the characteristic corresponding to the reflection signal, wherein the characteristic corresponds to a cause of a fault corresponding to a waveguide that couples the non-reciprocal signal routing component and an antenna. Instead of just determining the location of a fault by using a ToA of the reflection signal, or corresponding residual reflection signal, the amplitude may be used, perhaps with assistance of an artificial intelligence model, to determine the type, or nature, of the cause of the reflection signal, which may be further determined by a degree or characteristic of the reflection signal.

In an embodiment, the isolation leakage signal and the reflection signal may be provided form a port of the non-reciprocal signal routing component that is used to provide receive signals from an antenna to a receive path of the radio unit. Thus, the isolation leakage signal may be part of a transmit signal that leaks through the non-reciprocal routing component to the same port that provide receive-direction signals from an antenna to a receive path of the radio unit.

BRIEF DESCRIPTION OF THE DRAWINGS

FIG. 12 illustrates a high-level block diagram of a system embodiment.

FIG. 13 illustrates a high-level block diagram of a method embodiment.

DETAILED DESCRIPTION

Figure 1:
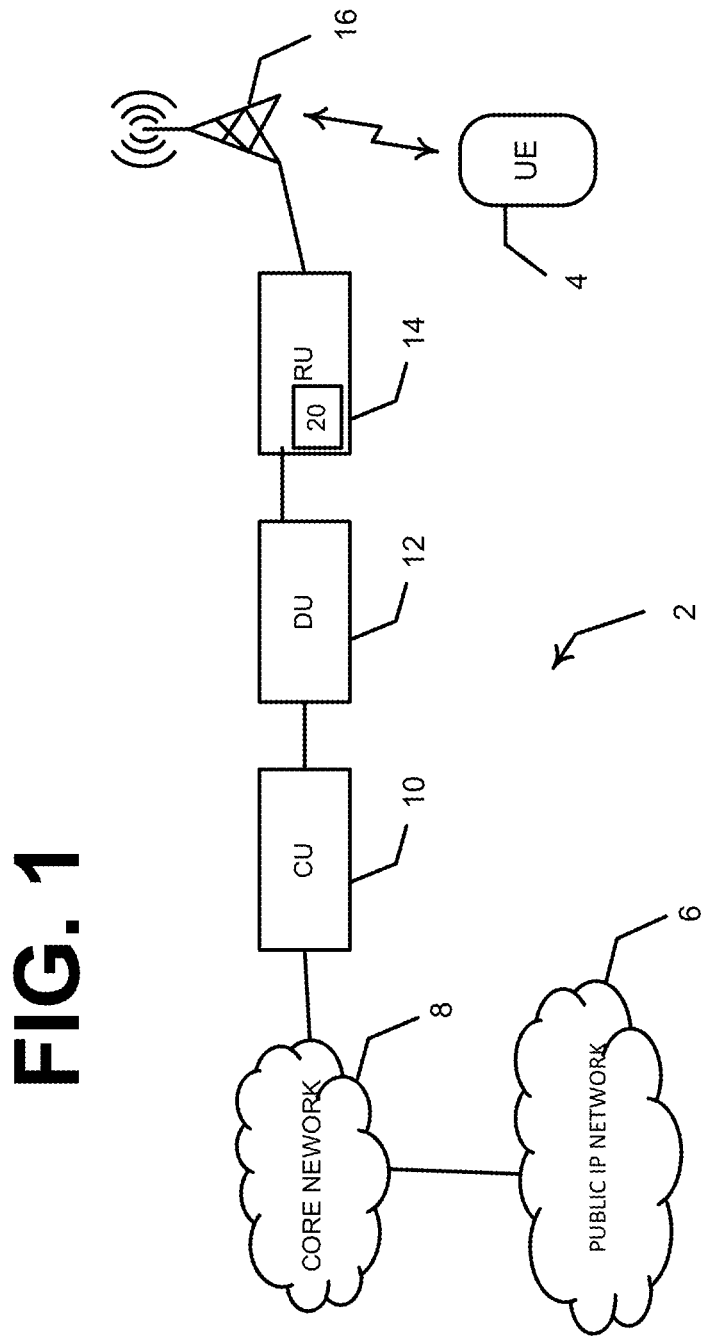
FIG. 1 illustrates a system diagram of transmit components of an O-RAN wireless communication network.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is only illustrative and exemplary of one or more concepts expressed by the various embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

One or more embodiments of the present application minimize firmware or software package updates transmitted to servers remote from a central location from which one or more update packages are distributed.

Turning now to the figures, FIG. 1 illustrates a system diagram of a transmit components of an O-RAN wireless communication network 2. User Equipment ("UE") 4 receives messages from communication network 6, which is shown in the figure as an Internet Protocol network. Network 6 may also comprise other types of networks, including voice communication networks, W-Fi networks, Bluetooth networks, and the like.

Messages sent from a device coupled with network 6 may be received and processed by core network 8, which may comprise components of a 3G, 4G, LTE, 5G, or later evolution version, wireless communication network. Core network 8 may include components such as a Mobility Management Entity ("MME"), a serving Gateway ("SGW"), a Packet gateway ("PGW"), a Policy Rules and Charging Rules Function ("PCRF"), and the like. Messages sent from a device coupled to network 6 via core network 8 propagate through central Unit 10, Distributed Unit 12, and radio Unit 14 before being transmitted wirelessly from antenna 16. RU 14 includes radio resources 20, discussed elsewhere herein. For purposes of discussion, CU 10, DU 12, RU 14, radio resources 20 and antenna 16 compose transmit components of an O-RAN; an O-RAN network may comprise other transmit or receive components, which may be discussed herein.

Figure 2:
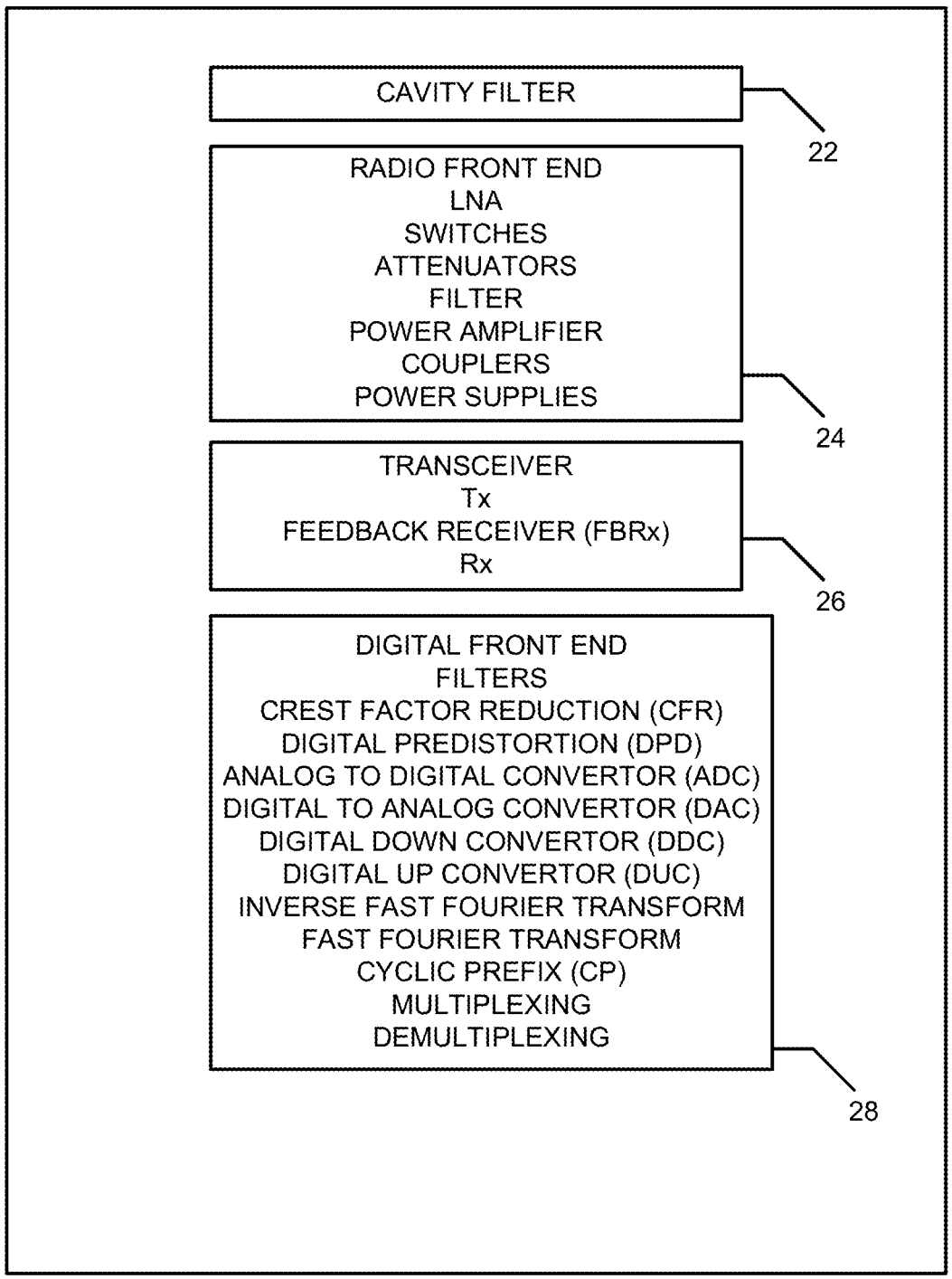
FIG. 2 illustrates radio resources provided by transmit components of a radio unit of an O-RAN wireless network.

Turning now to FIG. 2, the figure shows components, functions, features, modules, circuits, hardware, and algorithms the compose radio resources 20. Radio resources 20 comprise one or more filters, which may prevent interaction between transmitters in combining systems, reduce off channel sideband noise, harmonic or spurious outputs from transmitters, or may protect receiver front end and automatic gain control (AGC) circuits from off channel energy.

Radio front end 24 comprises components, examples of which may include: one or more low noise amplifiers. ("LNAs"), one or more switches, one or more antennas, one or more filters, one or more power amplifiers ("PAs"), one or more couplers, one or more circulators, one or more isolators, and one or more power supplies. Transceivers 26 may include one or more transmitters, one or more feedback receivers, and one or more receivers. Digital front end 28 may include one or more filters, one or more Crest Factor Reduction ("CFR") functions, one or more Digital Pre-Distortion ("DPD") functions, one or more Digital Upconverter ("DUC") functions, one or more Digital Downconverter ("DDC") functions, one or more Fast Fourier Transform ("FFT") functions or Inversion FFT functions, Cyclic Prefix ("CP") functionality, Multiplexing ("Muxing") and Demultiplexing ("Demuxing"), and the like.

Figure 3:
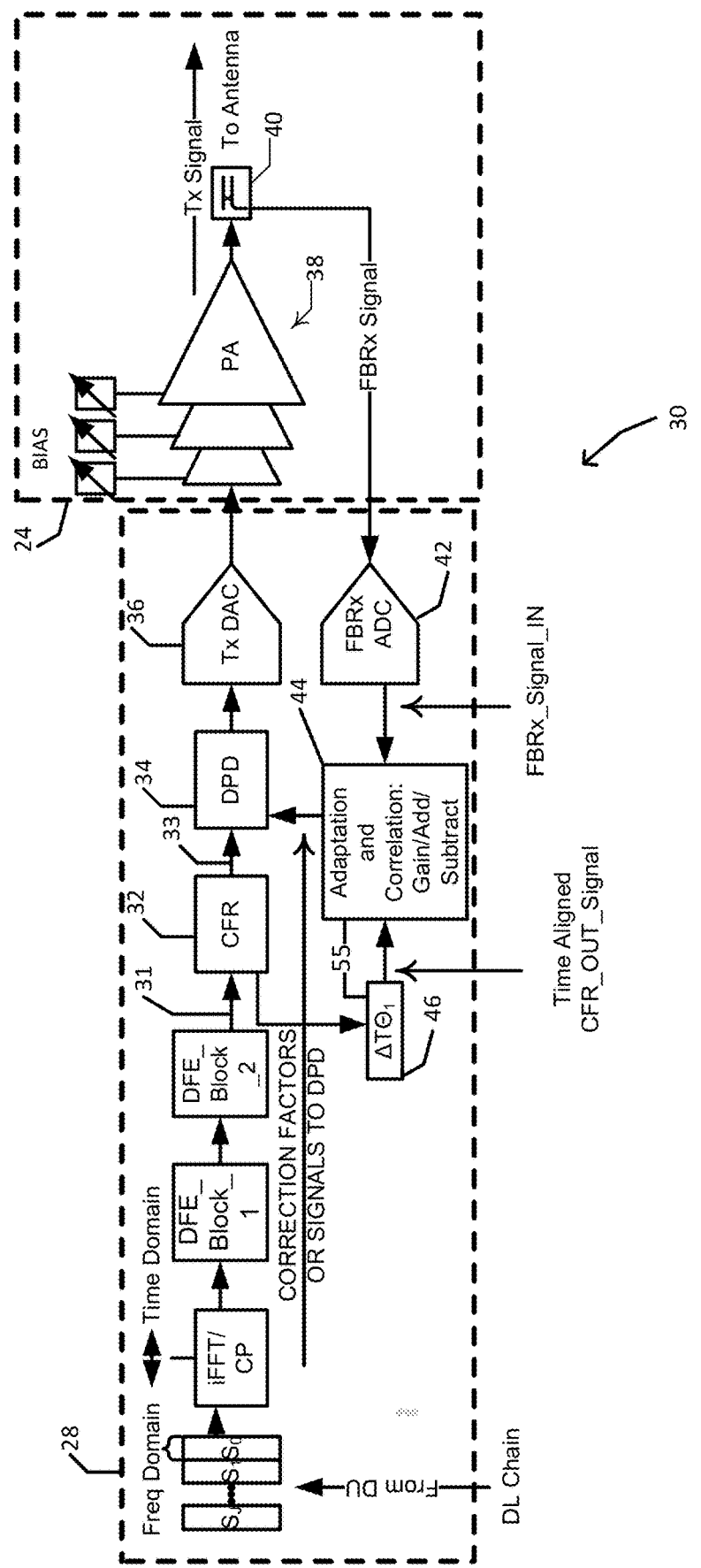
FIG. 3 illustrates a block diagram of radio resources transmit components of a radio unit of an O-RAN wireless network.

Turning now to FIG. 3, the figure illustrates a block diagram of radio resources 20 transmit components of a radio unit 14 of an O-RAN wireless network 2 as shown in FIG. 1. An input signal 31 to be transmitted is received by digital front end 28 from a DU 12 as shown in FIG. 1. Continuing with description of FIG. 3, the input signal is processed by CFR function 32 to reduce peak amplitude portions of input signal 31 to produce a clipped input signal 33. The clipped input signal is processed by DPD 34, which may apply error correction factors, for example transmit signal correction factors that may have been determined by a $\Delta T\Theta M$ function under the control of an error correction component, to result in a digitally predistorted signal that is provided to transmit digital to analog converter 36. DAC 36 provides an analog version of the predistorted clipped input signal to power amplifier(s) 38, which provides an amplified version of the analog version of the predistorted clipped input signal at an output of the power amplifier. The analog version of the predistorted clipped input signal may be referred to as a low-level analog transmit signal; the amplified version of the analog version of the predistorted clipped input signal may be referred to as an amplified analog transmit signal. The amplified analog transmit signal is provided from PA 38 to coupler 40, which forwards most of the power of the amplified analog transmit signal to an antenna. Coupler 40 routes a smaller portion, or feedback portion, of the amplified analog transmit signal to a receiver analog to digital converter 42, which may digitize the feedback portion into a digital version thereof and provide the digitized version of the feedback portion of the amplified analog transmit signal to an adaptation and correlation gain/add/subtract function, which may be referred to as adaptation function. The adaptation function may be implemented by error correction component 44 that may include software, firmware, circuitry, gates, etc. that implement the adaptation function. The error correction component may be a processor, ASIC, FPGA, or circuitry that is configured to implement the adaptation function. The adaptation function of error correction component 44 may use factors, which may include values, coefficients, expressions, functions, obtained from time, phase, and magnitude difference function 46, which may be referred to as $\Delta T\Theta M$ function 46, to determine one or more correction signals to be provide to DPD function 34, which may apply the correction signals to a signal received from CFR function 32. In an embodiment, the adaptation function may be a function performed by error correction component 44, which error correction component may comprise hardware, firmware, or software. Reference to either adaptation function 44, adaptation block 44, or error correction component 44, may have the same meaning insofar as in an embodiment the error correction component/adaptation function may control the $\Delta T\Theta M$ function 46 via control line 55 while the $\Delta T\Theta M$ function determines correction factors and applies the correction factors to a signal received from CFR function 32—the error correction component may then apply a mathematical function such as correlation, addition, subtraction, based on the signal received from the $\Delta T\Theta M$ function and the signal received from coupler 40. In an embodiment, error correction component 44 may instruct the $\Delta T\Theta M$ function 46 to continually determine/generate correction factors until the error correction component determines, via the performing of the mathematic operation, that the correction factors currently determined/generated by the $\Delta T\Theta M$ function and that are used to cause DPD 34 to predistort the signal provided to PA 38 have caused the signal transmitted from coupler 40 to match, as best as possible based on precision and accuracy of the $\Delta T\Theta M$ function, the signal output by CFR function 32. In an embodiment, error correction component 44 may comprise hardware, software, or firmware to carry out an adaptation function and may also comprise hardware, software, or firmware that comprises a $\Delta T\Theta M$ function, such as, for example, $\Delta T\Theta M$ function 46, or additional $\Delta T\Theta M$ functions. Error correction component 44 may cooperate with $\Delta T\Theta M$ function 46 via control line 55 to determine error correction factors, or coefficients, and may instruct the $\Delta T\Theta M$ function via the control line that the correction factor, or factors, be stored to the $\Delta T\Theta M$ function, or a memory related thereto, and may cause the $\Delta T\Theta M$ function to retrieve and use the correction factors in implementing, or carrying out, an adaption function, which may comprise a mathematic function for correcting for distortion caused by PA 38. In an embodiment, $\Delta T\Theta M$ function 46 may determine correction factors and may make them available for retrieval by error correction component 44 for application to a signal. In an embodiment, $\Delta T\Theta M$ function 46 may determine, retrieve, or use correction factors as instructed by error correction component. Correction factors may be determined such that signals at certain nodes are time-aligned. In other words, correction factors may be determined such that amplitudes and phases (or delay(s)) of signals that are to be added together are in phase with one another if enhancement of a given signal is desired, or in-phase but inverted if cancellation of one of the signals is desired. Applying an error correction signal to a signal to be corrected may comprise applying, for example adding, an inverted, in-phase version of the signal to be canceled to the signal to be canceled. Applying error correction may comprise inducing a delay in a signal to be canceled and applying an inverted version of the signal to be canceled that is in phase with the delayed signal to be canceled.

In an embodiment, error correction factors may be: determined by error correction component 44 and stored in $\Delta T\Theta M$ function 46 (or they may be determined by and stored in $\Delta T\Theta M$ function 46 in cooperation with the error correction component via control line 55), retrieved from the $\Delta T\Theta M$ function, and applied (or a signal adjusted according to the correction factors applied) within the error correction component without actually outputting an error correction signal, or an error corrected signal, for transmission by PA 38. Instead, error correction may occur 'virtually', or mathematically, inside error correction component 44 using error correction factors that are determined to provide an inverted version of a signal to be canceled such that another signal may be evaluated within the error correction component using different error correction components and with accuracy and precision provided by a $\Delta T\Theta M$ function. In such a scenario, correction factors that were determined by $\Delta T\Theta M$ function, while being controlled by error correction component 44, to correct distortion caused by PA 38, may be stored to DPD function 34 to free up the $\Delta T\Theta M$ function for determining of new correction factors for a different signal than a transmit signal. Canceling another signal, such as an isolation leakage signal, as discussed herein, to result in a residual isolation leakage signal, to reduce the leakage signal's amplitude tends to reduce masking, or 'overshadowing,' within error correction component 44 of a next signal, such as a reflection signal, that may be evaluated by the error correction component and that may have a lower magnitude than the signal already canceled, for example the isolation leakage signal. It will be appreciated that even if one signal is canceled within the error correction component and has a magnitude that is not substantially greater than another signal to be evaluated within the error correction component 44, and thus the signal that was already canceled would not have 'overshadowed' the next signal to be evaluated in terms of amplitude/magnitude, cancelling one signal within the error correction component before evaluating another signal may provide for better dynamic range in evaluating the next signal. Such evaluation within error correction component 44 may comprise determining a time of arrival ("ToA") of one or more signals using different error correction factors corresponding to the different signals to be evaluated. Error correction component 44 may perform analysis of signals based on error correction factors determined to correspond to the signals, and provide an output result, such as a time of arrival of one or more of the signals. Output values, data, or information that results from the analyzing may be used to determine a location of a reflection signal caused along an antenna path. A leakage signal that leaks through a circulator may be corrected virtually within the error correction component 44 to reduce the amplitude of the leakage signal to leave a leakage residue signal, or residual leakage signal. Error correction factors that are used to determine a ToA of the leakage signal and to reduce, attenuate, compensate for, or otherwise operate on the leakage signal may be stored in a ΔTΘM function and different error correction factors that are used to determine a ToA or to correct another signal, such as a reflection signal, may be stored in a different ΔTΘM function. Thus, evaluation of both signals and determining ToA corresponding to them, for example, may be performed with the same accuracy and precision that can be obtained when determining transmit signal correction factors that may be used by a DPD function.

Signal correction factors may be values, or coefficients, stored in registers of ΔTΘM function 46 that when, or if, processed by DPD function 34, produce a time-shifted or gain-adjusted version of an unwanted signal, or error, to be canceled. The unwanted, or erroneous, signal to be canceled may result from distortion caused by PA 38, which may result from nonlinear operation of the PA. Such nonlinear operation may be determined via a feedback signal provided from coupler 40 to receiver analog to digital converter 42. An adaptation function of error correction component 44 may analyze the feedback signal in comparison to the input signal received from CFR function 32 and may instruct ΔTΘM function 46 via control line 55 to store the correction coefficients (i.e., correction factors) to the ΔTΘM function when coefficients, or factors, determined by the ΔTΘM function cause a high correlation within the error correction component. The coefficients, or correction factors, which may be transmit correction factors, may include factors that correspond to, or are based on, a feedback signal received from coupler 40 or a signal received from CFR 32. Correction factors, such as transmit correction factors, that correspond to a complex conjugate version of a signal received along feedback path within a radio unit may be applied to linearize a transmit signal provided to coupler 40 and to an antenna to which it may be coupled. It will be appreciated that when used to correct for nonlinear operation of PA 38, correction factors, such as transmit signal correction factors, typically do not cancel all of a signal received from CFR 32—only signal energy that corresponds to distortion caused by the PA is cancelled based on the correction factors. The correction signal, or transmit signal correction factor(s), causes DPD 34 to provide a signal to TxDAC 36 that is a predistorted version of input signal 31 such that distortion caused by PA 38 cancels the predistortion of the input signal. An adaptation function or error correction component 44 may recall the factors stored in ΔTΘM function 46 and produce a signal that corresponds to, or may cause DPD 34 to produce a signal that corresponds to, distortion caused by PA 38 such that the distortion is cancelled when the correction factors, or a signal that is based on the correction factors, are applied by DPD 34 such that a transmit signal provided from coupler 40 to one or more antennas is substantially an amplified version of an input signal 31 provided from CFR function 32. An adaptation function of error correction component 44 may comprise, or perform, a mathematical function that uses correction factors retrieved from ΔTΘM function 46 to create/generate a correction signal that DPD 34 applies to an input signal 31 from CFR function 32. In effect, the combination of the error correction component 44 and DPD 34 block, using correction factors determined by ΔTΘM function 46, may function as a hardware-accelerated transistor modeler capable of correcting shortcomings (i.e., nonlinear operation) of transistors of PA 38. It will be appreciated that upconverters and downconverters may be present in a radio unit between DAC 36 and PA 38, and between coupler 40 and ADC 42, respectively, but are not shown in the figure for clarity. (Depending on the style of DAC or ADC, for example Sigma-Delta, upconverters or downconverters may not be used.)

Figure 4:
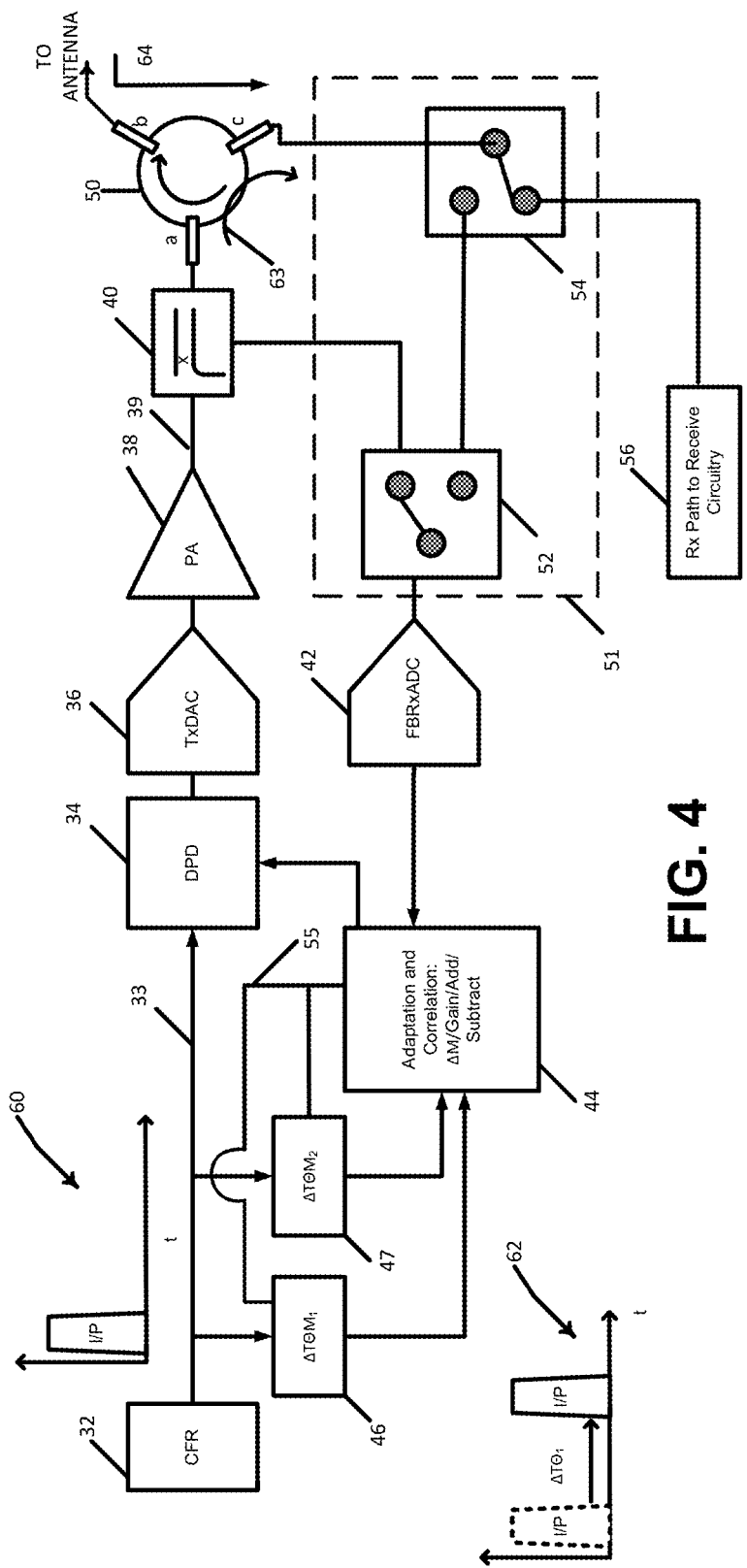
FIG. 4 illustrates an embodiment where components are configured to determine transmit signal correction factors.

Turning now to FIG. 4, the figure illustrates transmit components of an O-RAN radio unit configured to determine isolation signal correction factors. In addition to components shown in, and described in reference to, FIG. 3, FIG. 4 shows a second ΔTΘM function 47, circulator 50, and signal path selection component 51, which may comprise first switch 52. It will be appreciated that more ΔTΘM functions could be implemented and might be shown as blocks in parallel with ΔTΘM functions 46 and 47 and with control lines 55 coupled with the error correction component. First switch 52 is shown in the figure as a single pole double throw ("SPDT") switch but could comprise other types of switches. First switch 52 may provide its output to a feedback receiver and when configured with a first input connected to the output may be part of a feedback path within a radio unit. It will be appreciated that signal path selection component 51 may include components in addition to, or instead of, a switch that facilitates routing of signals with the signal path selection component.

FIG. 4 also shows a second switch 54 as part of signal path selection component 51, which second switch is also shown as a SPDT switch. Signal path selection component 51 may comprise a manual switch, a PIN diode switch, a circulator, or another other type of switch that may be operated either manually or may be operated in response to an electronic instruction or signal, such as a computer instruction or a signal voltage or a signal current received from a device or component, such as error correction component 44, which may provide, embody, be controlled by, be in communication with, or otherwise implement an adaptation function. A second switch 54 may include an output that provides a receive ($R_x$) path 56, which may provide one or more signals received from an antenna coupled to port c of circulator 50, or other signals flowing into port c, to receive path circuitry. Accordingly, second switch 54 can be configured to interrupt the providing of a signal coming from an antenna path into port c of circulator 50 to receive path 56 and instead provide a signal flowing into port c to feedback circuitry when second switch 54 and first switch 52 are configured in a second configuration It will be appreciated that signal path selection component 51 is illustrated as comprising first switch 52 and second switch 54, but may comprise components in addition to switches or instead of switches, and that switches are shown for purposes of discussion in showing schematically that the signal path selection component can be configured in a first configuration to provide a signal from coupler 40 to the adaptation function of error correction component 44 or that the signal path selection component may be configured in a second configuration to provide a leakage signal from circulator 50, or a signal received at port c of the circulator, to the error correction component. Accordingly, signal path selection component 51 should not be interpreted as necessarily comprising discrete hardware switches, although the signal path selection component could comprise hardware switches, to facilitate routing of signals according to the first configuration or second configuration. It will be appreciated that discussion of signal path selection component 51 may be provided herein in terms of first switch 52 and second switch 54 to correspond to the figures that show the first configuration or second configuration schematically in terms of one or more switches, but that other components that may alter, change, or switch a signal path route are contemplated and that switches are shown and described for purposes of visually showing in the figures that a signal path route is changeable, or selectable, between providing a feedback signal to error correction component 44 in a first configuration or providing to the error correction component a leakage signal from non-reciprocal signal routing component 50 in a second configuration. Furthermore, it will be appreciated that signal path selection component 51 may be capable of more than just two different configurations such that more than just a leakage signal, or other signal, from non-reciprocal signal routing component 50 may be provided to error correction component 44 in addition to providing a feedback signal in the first configuration.

Configurations of signal path selection component 51, for example configurations of the first and second switches, may be controlled by error correction component 44 or by DPD function 34. First switch 52 is shown in a first position, or first configuration, that connects a feedback signal from coupler 40 to feedback receiver ADC 42, which provides essentially the same feedback signal path as shown in FIG. 3 where there is no switch shown coupled between coupler 40 and ADC 42 in the feedback path. In FIG. 4, second switch 54 is shown such that isolation leakage signal 63 or reflected signal 64 received back from a waveguide coupling isolator 50 to an antenna via port c of the isolator, may be provided to a receiver of the radio unit of which it is part. In an embodiment, non-reciprocal signal routing component 50 may comprise a circulator. In an embodiment, in the arrangement shown in FIG. 4 where first switch 52 and second switch 54 are configured to provide a feedback path between coupler 40 and ADC 42, ΔTΘM function 46 may store correction factors that have been determined to cancel, time delay, correct signal shape, or correct/cancel other error/distortion, introduced by PA 38 relative to the signal provided from CFR function 32 to DPD function 34. In FIG. 4, input signal 60 illustrates a signal that may be provided from CFR function 32 to DPD function 34. Delayed signal 62 illustrates a signal as provided from PA 38 through coupler 40 to adaptation function 44. In an embodiment, correction factors may be stored to ΔTΘM function 46 when performing an error determination procedure to determine correction factors, or coefficients, that may correspond to the delayed signal 62. After the error determination procedure has been performed, adaptation function 44 may retrieve the correction factors corresponding to delayed signal 62 from ΔTΘM function 46 and digitally provide the correction factors, or a correction signal corresponding to the correction factors, to DPD 34 such that an inverse of error induced by, caused by, or otherwise introduced by, PA 38 is applied to the input signal (i.e., signal received from CFR function 32), and thus error caused by distortion in the PA is effectively canceled by DPD function 34 before the input signal (which has now been corrected by the predistortion function 34) is provided to PA. The correction factors that correct distortion caused by PA 38 may be referred to as transmit signal correction factors. Accordingly, even though PA 38 may still introduce a time delay, for example, as illustrated by delay signal 62 relative to signal 60, the predistortion function will have altered the signal provided to the PA. The predistortion function may alter the signal provided to PA 38 by providing, for example, a predistorted image signal of error introduced by the PA, such that the signal that is provided at an output of the PA to coupler 40 (this signal may be referred to as transmit signal 39), is substantially an amplified version (i.e., higher amplitude) of a clipped input signal 33 (clipped version of input signal 31) provided from CFR function 32 to DPD function 34. CFR function 34 may split clipped input signal 33 to feed DPD 34 and to feed ΔTΘM function 46, which may determine correction factors to be applied to correct for nonlinear operation of PA 38. In an embodiment, error correction component 44 may determine correction factors to be applied to correct for nonlinear operation of PA 38. The clipped input signal 33 may continue through ΔTΘM function 46 and may be combined within adaptation block 44 with the signal received from PA 38 via coupler 40 to produce an error correction signal, or an error correction factor, or factors, that is/are passed to DPD 34 to perform/facilitate the predistortion. In an embodiment, a signal from CFR 32 may be split and fed DPD 34 and may also be fed to ΔTΘM function 46, which may adjust the signal according to correction factors in the ΔTΘM function and within error correction component 44, and the adjusted signal may be combined with a signal from PA 38/coupler 40 to produce a first error signal that is passed to the DPD to facilitate predistortion. These coefficients, or correction factors, may be paused or frozen and maintained at the DPD function 34.

While DPD function 34 performs predistortion, path selection component 51 may be set to select a signal from non-reciprocal signal routing component 50 that within error correction component 44 may be combined with a time aligned signal output from ΔTΘM 46 to cancel a first leakage signal 63 from the non-reciprocal signal routing component using a mathematical function, for example invert and add. The canceled signal leakage signal may be held within error correction component 44 without being passed to DPD 34.

A residue signal that results from cancellation of the leakage signal at error correction component 44 from signal 63 may be maintained while a second time aligned signal output from ΔTΘM 47 may be combined, via invert and add for example, with another signal 64 to cancel the other signal leaving a residue of the other signal, which may comprise a reflection signal, which in turn may comprise a VSWR signal.

Some components shown in FIG. 4 may be part of digital front end 28.

Coefficients, or error correction factors, that may be determined for producing predistortion may be paused, or frozen, stored to, or maintained at, DPD function 34 for continued applying of predistortion, regardless of how path selection component 51 is configured.

When path selection component 51 is configured in a second configuration to route a signal from port c of circulator 50 through the feedback path to error correction component 44, the signal from the circulator may be combined by an adaptation function of error correction component 44 with a time-aligned signal from, or with a time-aligned signal based on, error correction factors from ΔTΘM 46 to cancel within the error correction component 44 a first signal, such as an isolation leakage signal 63, flowing from the circulator toward a receive circuit path. Such cancellation of the first signal may be performed by applying an invert and add mathematical function, for example, by an adaptation function within error correction component 44. This canceled leakage signal may be held, or stopped, within error correction component 44 without the cancelled leakage signal being passed to DPD 34, which cancelled, or attenuated, leakage signal may be referred to as a residue, or residual, signal of the leakage signal. The residue signal resulting from cancelation of the leakage signal 63 within error correction component 44 may be maintained while a second time-delayed signal output from ΔTΘM 47 (shown in FIG. 6) is combined, for example, by applying a second error correction signal according to an invert and add mathematical formula by an adaptation function within error correction component 44 to a second signal 64, which may be, for example, a reflection signal from an antenna path, to cancel the second signal and leave a second residual signal.

Figure 5:
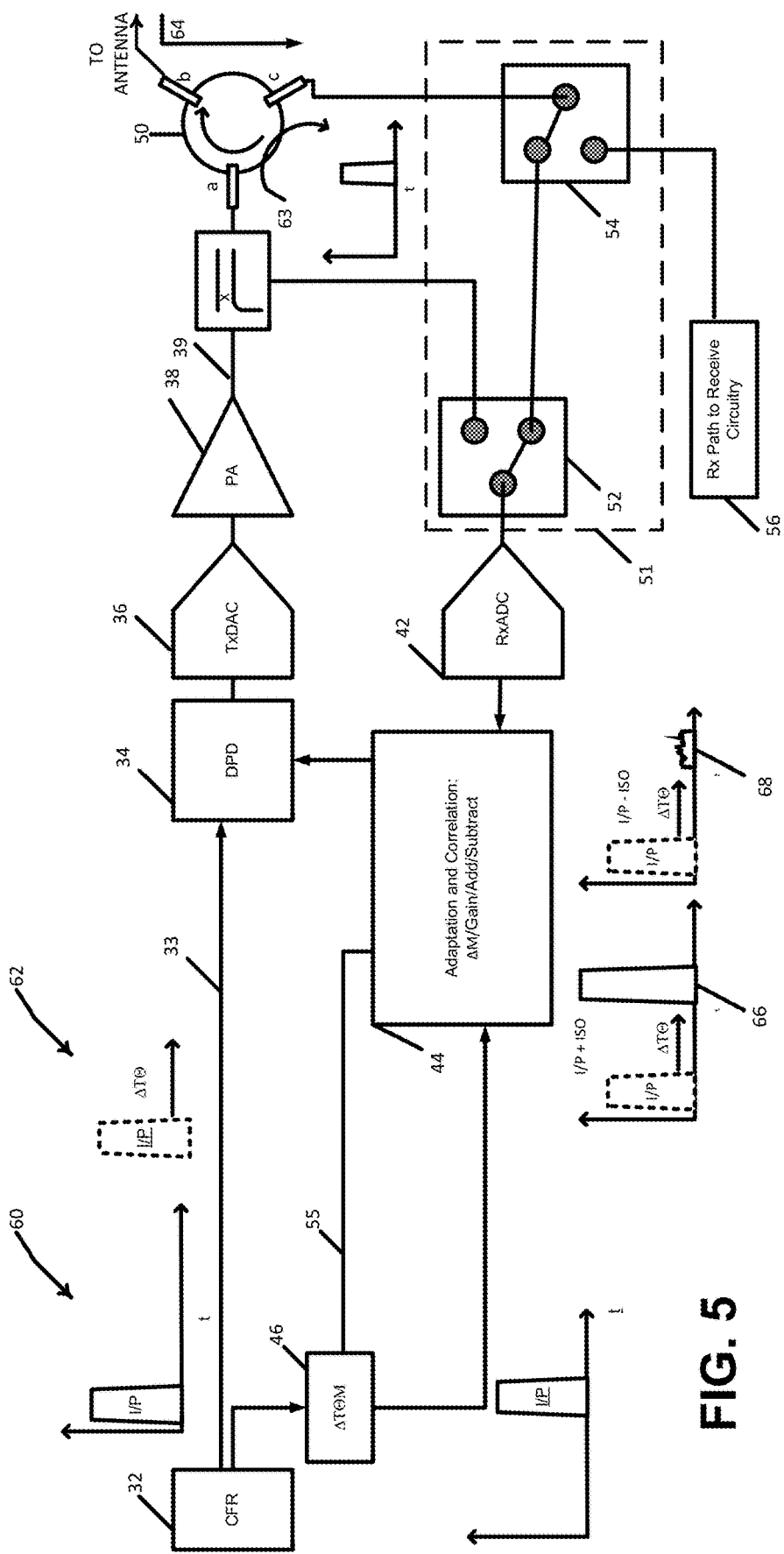
FIG. 5 illustrates an embodiment where components are configured to determine isolation signal correction factors.

Turning now to FIG. 5, the figure illustrates an embodiment where components are configured to determine isolation leakage signal correction factors and to determine correction factors for signals flowing from port c of non-reciprocal signal routing component 50. Instead of signal path selection component 51 being configured to provide a feedback signal received at a first input from coupler 40 to ADC 42, the signal path selection component may be configured in a second configuration to provide isolation signal 63, which is output from non-reciprocal signal routing component 50 at port c to ADC 42 (or other feedback path component). Ideally, non-reciprocal signal routing component 50 passes all of a transmit signal received at port a from coupler 40 to, and out of, port b. However, in the nonideal real world some of the transmit signal 'leaks' from port a to port c. This may be referred to as an isolation leakage signal-non-reciprocal signal routing component 50 ideally isolates, or prevents, a transmit signal provided at port a from reaching port c, which may also ideally pass all of a signal received at port b from an antenna. (It will be appreciated that, similarly, a portion of a signal received at port b, from an antenna, for example, may leak through isolator 50 and pass out of port a instead of all of the signal passing out of port c.) In the example shown in the figure, the non-reciprocal signal routing component 50 may be a circulator and may have an isolation leakage of, for example −15 dBc (approximately 3% of the transmit signal may 'leak' through to port c), although the isolator ideally should only have signals present at port c that were received at an antenna coupled to port b, or at least signals that are flowing in a direction from an antenna toward the circulator. The example isolation leakage value of −15 dBc is given as an example for purposes of illustration and is not meant to be a limiting example. Thus, in the configuration of signal path selection component 51 shown in FIG. 5, isolation signal 63 may be presented to ADC 42, which may provide a digital version of the isolation leakage signal (as well as any receive signal present at port b of non-reciprocal signal routing component 50) to error correction component 44. An adaptation function of error correction component 44 may determine that isolation leakage correction factors determined by first ΔTΘM function 46, which may be referred to as merely leakage signal correction factors, cancel the isolation leakage signal and may store, or cause to be stored, the isolation leakage signal correction factors in ΔTΘM function 46 instead of transmit correction factors discussed in reference to FIG. 4. (In such a scenario, the correction factors to be used for predistortion may be stored in DPD function 34 instead of in ΔTΘM function 46 if the ΔTΘM function is used to determine and to store correction factors other than transmit correction factors.) Thus, ΔTΘM function 46 may contain and have stored therein correction factors that can substantially cancel time delay or other distortion induced by PA 38 when configured according to the embodiment shown in FIG. 4, and/or ΔTΘM function 46 can contain and have stored therein isolation leakage signal correction factors that could cancel isolation leakage signal 63 when switches 52 and 54, or merely signal path selection component 51, is/are configured as shown in the embodiment illustrated in FIG. 5. It will be appreciated that the error correction factors that could cancel leakage signal 63 may be used by the adaptation function within error correction component 44 to produce a residual isolation leakage signal with lower amplitude than the isolation leakage signal such that better sensitivity, or dynamic range, can be achieved in analyzing another signal by the error correction component than if the isolation leakage signal had not been attenuated by the error correction components using correction factors determined by ΔTΘM function 46.

In an embodiment, ΔTΘM function 46 may be used to contain correction factors that can be used by an adaptation function of error correction component 44 to cancel distortion caused by PA 38 and ΔTΘM function 46 may also be used to contain correction factors that could be used to cancel the isolation leakage signal 63.

In an embodiment, the isolation leakage signal correction factors are not provided to DPD 34 for cancellation of isolation leakage signal 63 but are used by an adaptation function of error correction component 44 to determine a Time of Arrival ("ToA") of the isolation signal, or of an isolation residual signal corresponding to the isolation signal. In other words, cancellation/destruction of the isolation leakage signal through subtraction (or addition of an inverse) of the isolation leakage signal may be facilitated by mathematical means by the adaptation function within error correction component 44 but is not provided to, or applied to, clipped input signal 33 for further processing. As discussed, correction factors stored in, or retrieved from, ΔTΘM function 46 may include correction factors that can cancel distortion caused by PA 38 and isolation leakage correction factors may be stored in, or retrieved from, ΔTΘM function 46 to be used to cancel isolation leakage signal 63, even though a cancellation signal to cancel the isolation leakage signal is not provided by error correction component 44 to DPD function 34 and may be used only by an adaptation function of the error correction component to determine a residual isolation leakage signal. As an example, ΔTΘM function 46 may determine correction factors that result in a correction signal 66 that cancels isolation leakage signal 63 that results from signal 60. The result is a leakage residual signal represented by signal 68. In an embodiment, the time delay based on the ToA determined from isolation leakage signal correction factors may be used by an adaptation function of error correction function 44 to delay input signal 60 from CFR function 32 to cancel the isolation leakage signal, thus leaving within the error correction component a residual signal corresponding to the isolation leakage signal, which may be referred to as an isolation leakage residual signal, or just leakage residual signal, as represented by signal 68. A ToA of the isolation residual signal may be the same as a ToA of the isolation signal itself. In an embodiment, ToA of the isolation leakage signal, or the isolation residual signal, may be used for determining degradation of non-reciprocal signal routing component 50 over time.

The ToA of the isolation leakage residual signal may also be used to distinguish the residual signal that may be due to the isolation leakage signal from another signal that may be provided from non-reciprocal signal routing component 50, such as a reflection signal 64 that may be returned from an antenna waveguide to the non-reciprocal signal routing component at port b. For example, by determining the ToA of the isolation leakage signal, or the isolation leakage residual signal, a time reference may be established such that the ToA of an isolation leakage signal at error correction component 44 is to and the ToA at the adaptation function of another signal that that may be received at port b of isolator 50 may be deemed as $t_1$.

Determining ToA of the residual isolation leakage to determine error correction factors that cancel the leakage signal within error correction component 44 may facilitate determining ToA, of another signal such as reflection signal 64, which may have less amplitude than the isolation leakage signal 63, due to the isolation leakage signal 63 masking the other signal, such as a reflection signal, being evaluated.

In an embodiment, the ToA or the isolation residual signal, which may be a first leakage signal, may be determined and then the first leakage signal may be cancelled by an adaptation function within error correction component 44. After the first leakage signal is canceled, at least mathematically canceled within error correction component 44, other signals, such as a reflection signal, which may be a VSWR signal based on a reflection signal, that may have a lower amplitude than the first leakage signal, may be evaluated because the amplitude of the first leakage signal has been cancelled or attenuated such that a signal having a lower amplitude that may also be present at an output of the signal path selection component 51 while configured in a second configuration is not masked by the first leakage signal. By reducing a magnitude, at least mathematically with an adaptation function error correction function 44, of the first leakage signal to a residual first leakage signal, electronic sensitivity within error correction component is not overpowered by the amplitude of the first leakage signal relative to a possibly lower amplitude of the other signal, such as a reflection signal. Even if the reflection signal is not of significantly less amplitude that the isolation leakage signal, cancelling the isolation leakage signal such that only an isolation leakage residual signal remains provides a benefit. Put another way, the greater the amplitude of the first isolation leakage signal the more another signal that also flows from port c of circulator 50 is masked-reducing the amplitude of the first isolation leakage signal reduces masking of a reflection signal, for example that may have a lower amplitude than the isolation signal flowing from port c of the circulator.

Determining ToA of the isolation leakage signal facilitates the error correction component 44 in generating the residue signal by mathematically cancelling the first leakage signal. Reducing the isolation leakage signal amplitude within the error correction component 44 facilitates the determining of the presence of a second (or third, fourth, etc.) reflected signal (or VSWR), or other signal. Second, third, fourth, or more, other signals may be corrected within error correction component 44 using second, third, fourth, or more respective ΔTΘM functions. Determining within the error correction component 44 a second residue corresponding to the reflection signal facilitates determining useful information, such as ToA or distance to fault, that correspond to the reflection signal. Aligning, both phase and magnitude, based on ToA), a time-aligned inverse signal corresponding to a signal to be canceled with the signal to be canceled facilitates determining, and mathematically cancelling, the signal to be cancelled. ToA values of second or subsequent signals that can be determined and used to cancel (i.e., substantially attenuate), at least mathematically, the respective second or subsequent signals, can be used by an operator of a radio system for trouble shooting and debugging of components of the system. It will be appreciated that more ΔTΘM functions could be implemented, and might be shown as blocks in parallel with ΔTΘM functions 46 and 47. The components shown in FIG. 5 may be part of digital front end 28 shown in FIG. 3.

Figure 6:
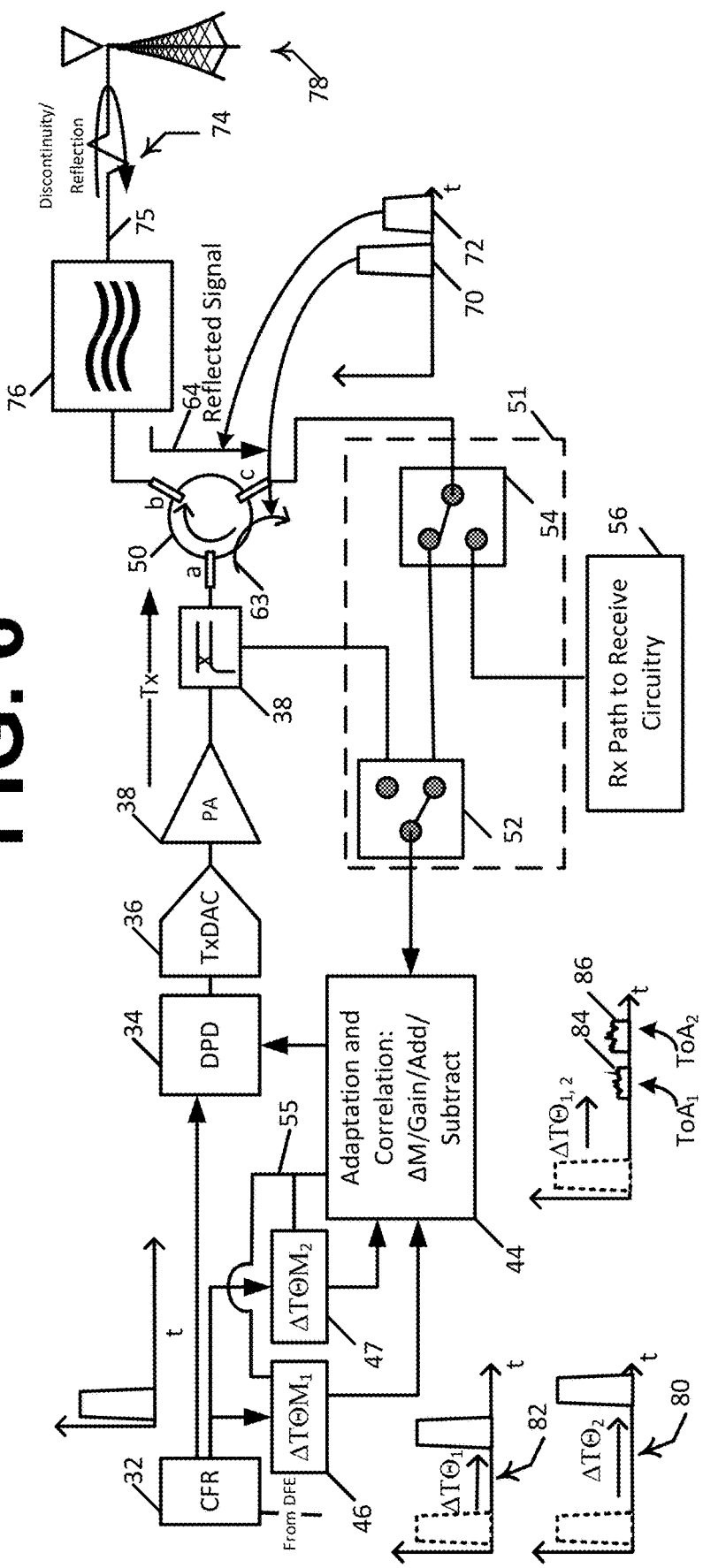
FIG. 6 illustrates an embodiment where components are configured to determine reflection signal correction factors.

Turning now to FIG. 6, the figure illustrates components configured to determine reflection signal correction factors. FIG. 6 shows isolation leakage signal 70 and reflection signal 72 that correspond to isolation leakage signal 63 and reflection signal 74, respectively. In the embodiment shown in the figure, reflection signal 64 may be caused by a line fault 74 in a wave guide 75, which may be a coaxial cable, that couples filter 76 and antenna 78. Fault 74 may be the result of a corroded connecter along waveguide 75, a cut in the waveguide, a severe bend, or crimp, in the waveguide that causes severe mechanical distortion of a conductor or dielectric of the waveguide, or other similar mechanical stress. Fault 74 could also result from a strong electromagnetic signal disrupting propagation of a signal transmitted from port b of circulator 50.

Reflection signal 64 may also result from a change of operating condition at antenna 78. For example, ice, or material left behind by birds, may have formed on antenna 78 and may have caused, or induced, reflection signal 64 because the material formed on the antenna has changed the permittivity of the material of an RF element of the antenna and thus the dielectric constant of the antenna (e.g., &g is 1.0006 for air but 4.2 for ice).

Moreover, the correction factors stored in ΔTΘM function 47 may be used to determine the existence of fault 74 in waveguide 75 even if there is not ice or other material on an element of antenna 78. By determining with ΔTΘM function 47 a reflection signal delay 80 (which may correspond to ToA of the reflection signal 72) of reflection signal 72 (which may correspond to reflection signal 64) and storing correction factors that correspond to the delay of the reflection signal, an adaptation function within error correction component 44 may be able to calculate a distance from port c, or from filter 76, to fault 74 to facilitate maintenance personnel finding and repairing the fault condition. A Voltage Standing Wave Signal ("VSWR") could be the reflection signal 64. A benefit of having separate ΔTΘM functions 46 and 47 (or more) is that correction factors stored in the different ΔTΘM functions can be used to cancel two (or more) different signals within error correction component 44. For example, ΔTΘM function 46 can be used to generate isolation leakage signal correction factors that can be used to cancel isolation leakage signal 63 to result in residual isolation leakage signal 84 by applying isolation leakage correction factors that produce time delay, phase, and magnitude align of signal 82 by an adaptation function within error correction component 44. (Transmit correction factors from ΔTΘM function 46 may also be used to cancel distortion caused by PA 38 under normal operation of the radio unit before the isolation leakage correction factors are determined.) Correction factors determined by, and stored in, another ΔTΘM function 47 can be used to cancel reflection signal 64 by an adaptation function within error correction component 44. An advantage of using a ΔTΘM function to cancel an isolation leakage signal, or any other signal, is that correction factors generated by a ΔTΘM function can induce a time delay within one wavelength of the signal to be cancelled and can also induce a phase shift that can result in further precision in terms of fractions of a wavelength of the signal to be cancelled. Thus, correction factors determined by a ΔTΘM function can be used to cancel a leakage signal, a reflection signal, or another signal with greater precision than if a ΔTΘM function was not used. In other words, using correction factors stored in registers of ΔTΘM function 46, for example, to cancel/attenuate isolation leakage signal 63 within error correction function 44 may be used to reduce the amplitude of the isolation leakage signal by producing correction factors to produce, within the error correction component, an isolation leakage residual signal 84 such that the adaptation function within the error correction component can process another signal using separate correction factors stored in, and retrieved from, ΔTΘM function 47 that may correspond to fault signal/reflection signal 72. Reducing the amplitude of an isolation leakage signal to a residual isolation leakage signal as described herein may facilitate processing within the error correction component 44 of the reflection signal with less masking, resulting in better determining of reflection signal correction factors and thus a better reduction in amplitude of the reflected signal, as shown by a reduced amplitude reflection signal 86. Even if reduction of the amplitude of the reflection signal is not a desired goal, a lower amplitude of the residual reflection signal corresponds to having determined a better set of reflection correction factor(s) in ΔTΘM function 47 and thus may result in a better (i.e., more accurate) determining of a ToA of the reflection signal. The components shown in FIG. 6 may be part of digital front end 28. It will be appreciated that signals, for example signals 60, 62, 66, 68, 70, 72, 84, 86 are represented in the figures on a scale with a time (t) horizontal axis, but that the 'pulses' shown as representing the signals are frequency domain spectrums of the respective signals. The signal representations in the figures are not meant show that the signals are necessarily pulse signals, although signal referenced herein could potentially comprise a pulse signal in the time domain. It will be appreciated that more ΔTΘM functions could be implemented and might be shown as blocks in parallel with ΔTΘM functions 46 and 47 with corresponding control lines 55. Each of a plurality of ΔTΘM functions, which plurality could comprise more than ΔTΘM functions 46 and 47, could be used, respectively, to generate a residual leakage signal, then a residual reflection signal, and then a residue of each of the other signals such that a given signal is attenuated using error correction component 44 to reduce masking of another, or a next, signal to be evaluated within the error correction component in cooperation with a ΔTΘM function corresponding to the signal to be evaluated.

Figure 7:
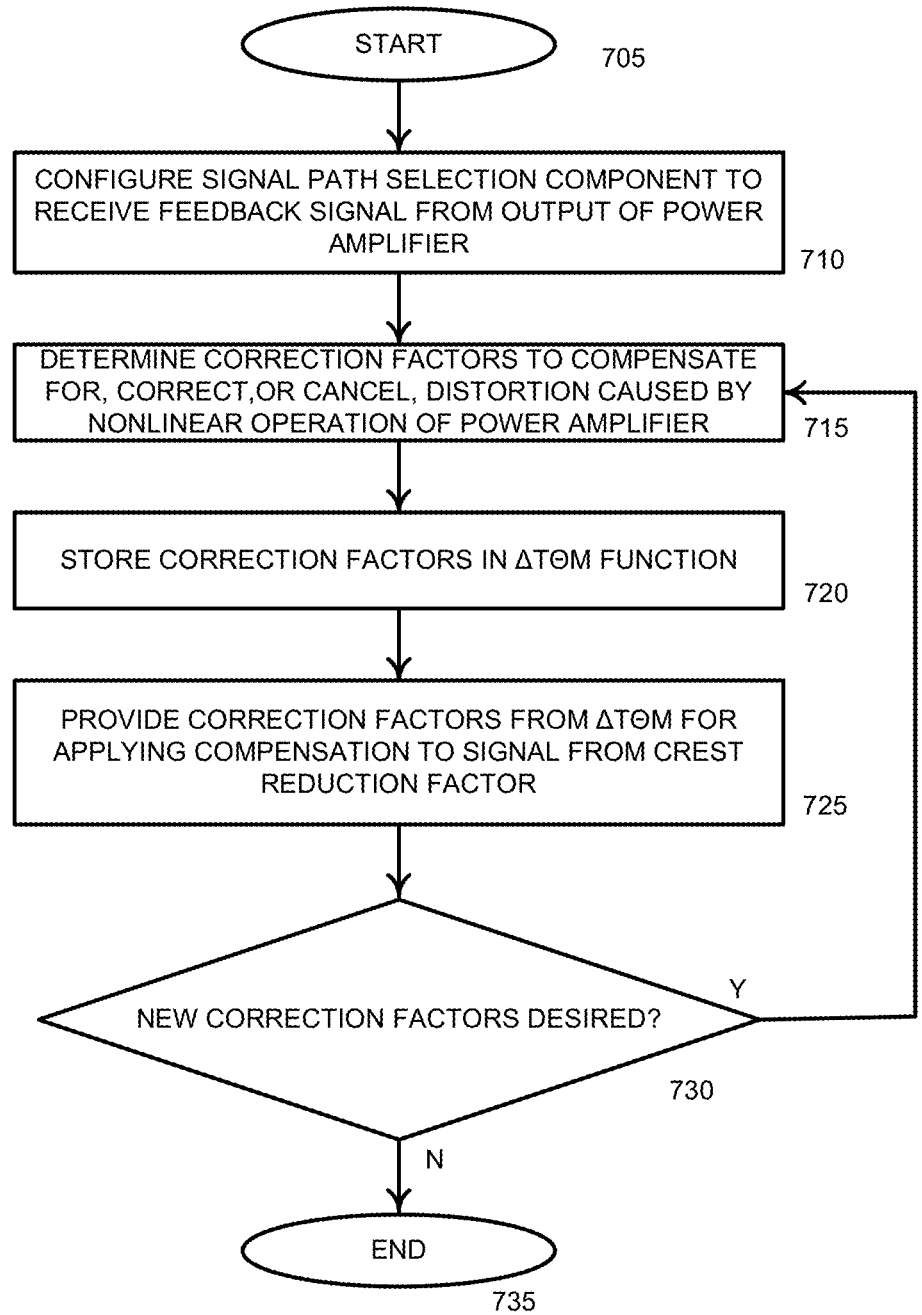
FIG. 7 illustrates a flow diagram of method of determining and applying transmit error corrections factors.

Turning now to FIG. 7, the figure illustrates a flow diagram of a method 700 to cancel, or substantially attenuate, distortion of a wireless transmit signal where the distortion may be induced by, caused by, introduced by, or generating by, a power amplifier in a radio unit of a wireless communication system, such as a O-RAN system, or a 4G, 5G, or later wireless communication system/network. It will be appreciated that method 700 may also be implemented in a UE device that transmits wireless communication signals to an O-RAN, 4G, 5G, or later generation communication system. Method 700 may be performed in whole or in part by a processor of a radio unit that implements, facilitates, operates, or performs an adaptation function, such as described in reference to adaptation function 44 elsewhere herein. Some, or all, steps of method 700 may be implemented as functions or modules in logic of an FPGA, logic of discrete digital circuitry, logic formed by discrete analog circuitry, or logic within a processor that has computer code stored thereon to cause the performance of the steps of the method wherein the processor is part of a radio unit, or system corresponding thereto, that is performing the steps and functions of the method or in a processor that is located remotely from, or that is not part of, the radio unit or a system thereof.

Method 700 begins at step 705. At step 710 a signal path selection component, which may comprise a first switch, is configured in a first configuration to receive feedback from a power amplifier output of a radio unit. The feedback may be provided to the signal path selection component at a first input thereof from a coupler which directs an attenuated portion split from a transmit signal that is provided to the power amplifier to be transmitted thereby. The feedback may be in digital form or in analog form. At step 715 one or more correction factors are derived, generated, created, modified, revised, or otherwise determined with a first ΔTΘM function, such as ΔTΘM function 46 shown in FIG. 6, to compensate for, or correct for, distortion caused by nonlinear operation of a power amplifier of the radio unit. The correction factors may be coefficients, values, algorithms, links, or other information or data that may be used to generate a correction signal or to generate correction instructions that can produce a correction signal that when applied by a predistortion function to the signal to be transmitted by the power amplifier can be used to cancel, or substantially attenuate, distortion caused by the power amplifier. At step 720 correction factors are stored in the first ΔTΘM block. The ΔTΘM block may comprise one or more FPGA logic circuits or implementations or may be part of an application specific integrated circuit that is part of the radio unit. At step 725 correction factors, one or more correction signals based on correction factors, or one or more correction instructions that are based on correction factors, may be provided to a digital predistortion function from the first ΔTΘM function. The digital predistortion function applies the correction factors or provides a correction signal based on the correction factors to a transmit signal to be transmitted that is received from a CFR function. At step 730 a determination is made whether new correction factors are desired for digital predistortion. For example, after a predetermined period has elapsed since a previous determination of correction factors and application thereof to a signal to be transmitted by the power amplifier was performed new correction factors may be generated to compensate for changes in distortion caused by the power amplifier, for example changes caused by temperature change at the power amplifier, or other factors that may affect distortion caused by the power amplifier and transfer function nonlinearities that may result therefrom. If a determination is made at step 730 that new correction factors are desired method 700 returns to steps 715 and proceeds as discussed above. If at step 730 a determination is made that new correction factors are not desired or needed for digital predistortion, method 700 advances to step 735 and ends. After method 700 ends at step 735, the signal path selection component may remain configured such that feedback from the power amplifier may continue to be available to adaptation function or error correction component 44, for example. The error correction component may instruct that the digital predistortion function continue to apply the correction factors, or a signal based thereon, to the transmit signal received from the CFR function but may not continue to update the correction factors such that the correction factors, or correction signal based thereon, are not constantly being updated.

Method 700 may be performed during test conditions such that a pulse signal is provided from the CFR function as a signal to be transmitted by the power amplifier and the correction factors are derived, generated, or otherwise produced based on the pulse test signal. After correction factors have been determined and implemented by the digital predistortion function, method 700 may remain dormant, or paused, until the adaptation function may be instructed to perform another test of a transmit signal. In an embodiment a test condition duration, or period, may be interleaved with actual signals that are desired to be transmitted according to a predetermined scheme or plan. In an embodiment, the test condition, or test period, may be manually requested by a technician based on signal strength and quality measurements obtained from a transmit signal being transmitted from an antenna that receives the transmit signal provided from the power amplifier.

Figure 8:
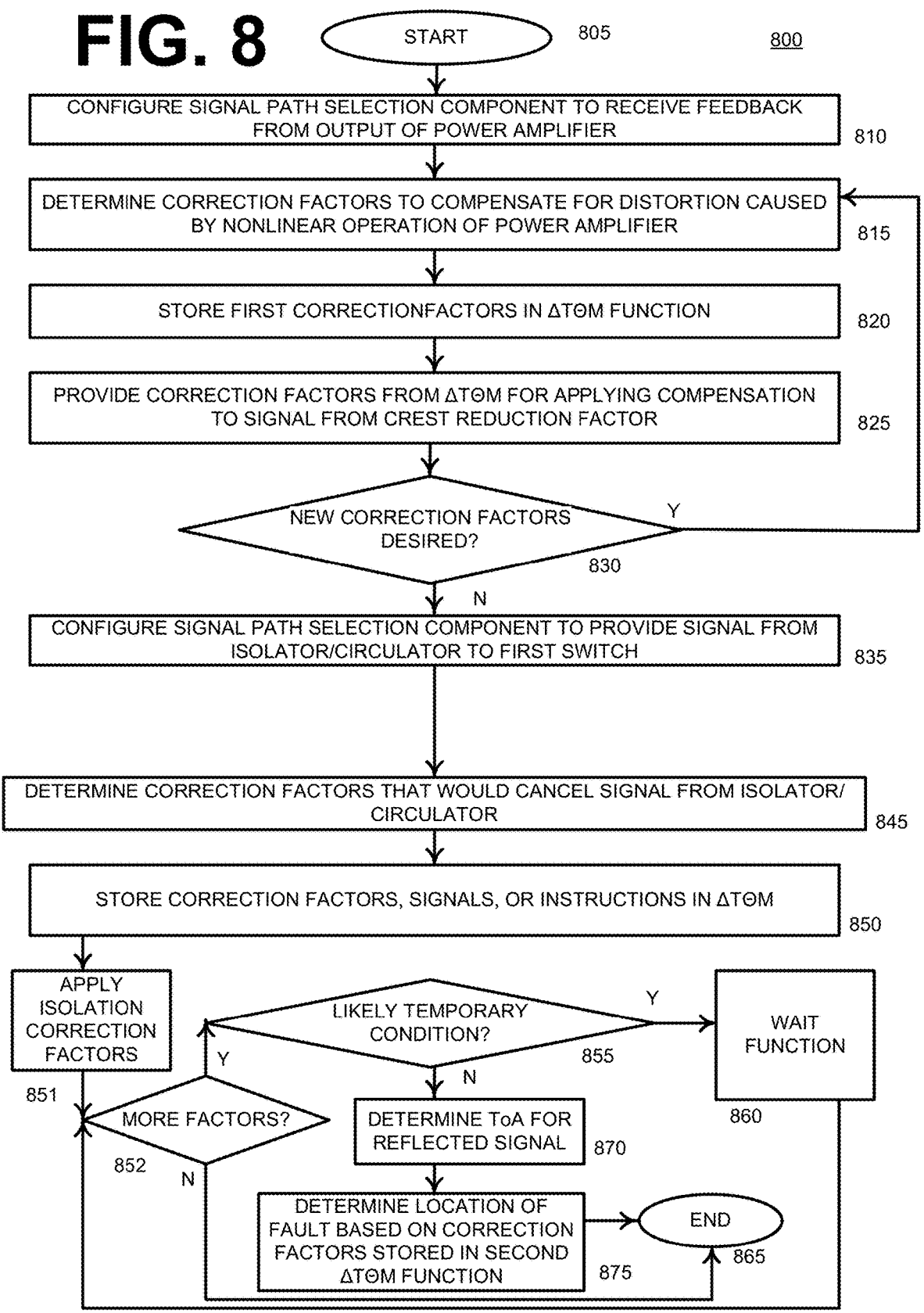
FIG. 8 illustrates a flow diagram of a method of determining and applying error isolation signal and reflection signal correction factors in addition to applying transmit signal correction actors.

Turning now to FIG. 8, the figure illustrates a flow diagram of a method 800 to cancel, or substantially attenuate, distortion of a wireless transmit signal where the distortion may be induced by, caused by, introduced by, or generating by, a power amplifier in a radio unit of a wireless communication system, such as a O-RAN system, or a 4G, 5G, or later wireless communication system/network. Method 800 may also be used to determine Time or Arrival of an isolation signal and other signals, such as reflection signals, for diagnostic purposes and RF component maintenance purposes. It will be appreciated that method 800 may also be implemented in a UE device that transmits wireless communication signals to an O-RAN, 4G, 5G, or later generation communication system. Method 800 may be performed in whole or in part by a processor of a radio unit that implements, facilitates, operates, or performs an adaptation function, such as described in reference to Adaptation function 44 elsewhere herein. Some, or all, steps of method 800 may be implemented as functions or modules in logic of a field programmable gate array ("FPGA"), application specific integrated circuit, ("ASIC"), radio frequency system on a chip ("RFSoC"), radio frequency integrated circuit ("RFIC"), logic of discrete digital circuitry, logic formed by discrete analog circuitry, or logic within a processor that has computer code stored thereon to cause the performance of the steps of the method wherein the processor is part of a radio unit, or system corresponding thereto, that is performing the steps and functions of the method or in a processor that is located remotely from, or that is not part of, the radio unit or a system thereof. Components that perform some of, or all of, the steps of method 800 may be part a digital front end of a radio unit.

Method 800 begins at step 805. At step 810 a signal path selection component, which may comprise a first switch, may be configured in a first configuration to receive feedback from a power amplifier output of a radio unit. The feedback may be provided to the signal path selection component at a first input thereof from a coupler which directs an attenuated portion split from a transmit signal that is provided to the power amplifier to be transmitted thereby. The feedback may be in digital form or in analog form. At step 815 with first $\Delta T\Theta M$ function, such as $\Delta T\Theta M$ function 46 shown in FIG. 6, one or more first correction factors may be derived, generated, created, modified, revised, or otherwise determined to compensate for, or correct for, distortion caused by nonlinear operation of the power amplifier. The first correction factors may be coefficients, values, algorithms, links, or other information or data that may be used to generate a correction signal or to generate correction instructions that can produce a correction signal that when applied to the signal to be transmitted by the power amplifier to a predistortion function can cancel or substantially attenuate distortion caused by the power amplifier. At step 820 first correction factors are stored in the first $\Delta T\Theta M$ block. The first $\Delta T\Theta M$ block may comprise one or more FPGA logic circuits or implementations or may be part of an application specific integrated circuit (which may also comprise circuitry configured to perform an adaptation function or digital predistortion functionality) and that is part of a radio unit. At step 825 first correction factors, which may be referred to as transmit signal correction factors, one or more transmit correction signals based on the transmit correction factors, or one or more transmit correction instructions that are based on the transmit correction factors, may be provided to a digital predistortion function. The digital predistortion function may apply the transmit correction factors, or provide a transmit correction signal based on the transmit correction factors, to a transmit signal to be transmitted that is received from a CFR function. At step 830 a determination is made whether new transmit correction factors are desired for digital predistortion. For example, after a predetermined period has elapsed since a previous determination of correction factors and application thereof to a transmit signal to be transmitted by the power amplifier were generated, new transmit correction factors may be generated to compensate for changes in distortion from the power amplifier, for example changes caused by temperature change of the power amplifier, or other factors that may affect distortion caused by the power amplifier and transfer function nonlinearities that may result therefrom. If a determination is made at step 830 that new transmit correction factors are desired method 800 returns to steps 815 and proceeds as discussed above. If at step 830 a determination is made that new transmit correction factors are not desired or needed method 800 advances to step 835.

At step 835 the signal path selection component, which may comprise a second switch, may be configured in a second configuration to receive and pass leakage signal from a non-reciprocal signal routing component to an adaptation function of a radio unit. The non-reciprocal signal routing component may be a circulator. The leakage signal may be provided to the signal path selection component, or a second switch thereof, at a second input thereof from the non-reciprocal signal routing component and the signal path selection component may be configured to receive and pass to an error correction component an isolation leakage signal, or other signal, from the non-reciprocal signal routing component instead of passing the feedback signal from a transmit coupler. At step 845, with the first ΔTΘM function, one or more leakage signal correction factors may be derived, generated, created, modified, revised, or otherwise determined that could compensate for, or correct for, the leakage signal. This determination may be based on a correlation function within an error correction component, such as error correction component 44 shown in other figures herein. The transmit correction factors may have been stored to a DPD function for continual applying of the transmit correction factors to counteract nonlinear operation of a PA of the radio unit. The leakage signal correction factors may be referred to as isolation leakage signal correction factors. The isolation signal correction factors may overwrite, or replace, other correction actors, such as transmit correction factors that have been provided to a DPD function. If a signal, or signals, other than a leakage signal is being addressed, such as, for example, a reflection signal, the correction factors determined at step 845 may be referred to as reflection signal correction factors, or another type of signal correction factor depending on the type of signal from which they are derived and may be referred to as second correction factors. The second correction factors may be coefficients, values, algorithms, links, or other information or data that may be used to generate a second correction signal or to generate second correction instructions that can produce a second correction signal that can cancel or substantially attenuate the reflection signal. It will be appreciated that in an embodiment, the second correction factors may be determined and applied within an adaptation function of an error correction component of the radio unit for purposes of diagnostics and further evaluation.

At step 850 the second correction factors may be stored in, or to, the first ΔTΘM compensation function block. In an embodiment, the second correction factors may be stored in, or to, a second ΔTΘM compensation function block instead of the first ΔTΘM compensation block. As with the first ΔTΘM compensation function block, the second ΔTΘM compensation function block may comprise one or more FPGA logic circuits or implementations or may be part of an application specific integrated circuit ("ASIC") (which may also comprise circuitry configured to perform an adaptation function or digital predistortion functionality) and that is part of the radio unit. Thus, an ASIC used in a radio unit may comprise one, two, or more than two, ΔTΘM compensation functions/blocks to store one or more sets of correction factors that can be used to cancel one or more undesirable signals, signal artifacts, or other distortion of a signal to be transmitted, or used to determine correction factors that could be used to cancel one or more undesirable signals, signal artifacts, or other distortion of a signal but that are only used to determine within an adaptation function one or more ToA(s) of one or more corresponding undesirable signals, or other signals, that may be present in a radio unit signal path.

At step 851 The isolation leakage signal may be cancelled by the adaptation function within an error correction component according to the isolation leakage signal correction factors, leaving a leakage residual signal. A ToA of the leakage residual signal can be determined. A leakage residual signal ToA may correspond to the isolation leakage signal that 'leaks' through an isolator, such as a circulator. Further analysis may be performed based on the isolation residual signal ToA or based on isolation signal correction factors, which may be stored in a first ΔTΘM function/block, or which may be stored in a second ΔTΘM compensation function, or other ΔTΘM compensation function. For example, further analysis may comprise determining degradation of the circulator or other component of the radio unit. Further analysis, or other analysis, may include analyzing reflection signals from mechanical or electrical failures as discussed elsewhere herein. In an embodiment, further analysis may include analysis similar to analysis performed by a radar system, or application of a radar pulse or pulse compression through a matched filter, or general spectral analysis of an environment or objects surrounding an antenna.

At step 852, a determination is made whether to determine corrections factors for another signal, such as a reflection signal, that is present at a receive port of a non-reciprocal signal routing component, such as a circulator, which receive port may be the same port at which the isolation leakage signal is provided for determination of the isolation correction factors. If a determination is made to not evaluate additional signals, method 800 advances to step 865 and ends.

If a determination is made at step 852 to analyze, and determine correction factors for, an additional signal at step 855, a determination is made whether the additional signal is the result of a condition that is likely temporary or the result of a non-temporary condition such as a waveguide fault between a circulator and an antenna. An example of temporary condition may be when outdoor weather has resulted in ice forming on one or more antenna elements and thus causing a temporary change in a dielectric constant, or change in dielectric properties, of an antenna. If a condition causing a reflection signal is determined to be temporary, then method 800 advances to step 860.

At step 860, a wait function may be performed, wherein a predetermined period may elapse, after which method 800 may return to step 852. The predetermined period may be a selectable period and may be selected to correspond to an amount of time that may typically be needed for a temporary condition to correct itself. At step 852 a determination may be made whether further correction factors may be needed. The further correction factors may be referred to in an embodiment as third correction factors. The one or more third correction factors, one or more third correction signals based on the third correction factors, or one or more third correction instructions that are based on the third correction factors, may be determined by an adaptation function in cooperation with a ΔTΘM compensation function, and may be stored in a ΔTΘM function, which may be a second ΔTΘM function such as ΔTΘM function 47 shown in FIG. 6.

Returning to description of step 855, if a determination is made that the condition causing the addition signal, which may be a reflection signal, is not caused by a temporary condition, method 800 advances to step 870. At step 870 third correction factors may be determined for the reflection signal, or other additional signal. The third correction factors may be stored in the second ΔTΘM compensation function block and may be used by, or a signal that has been adjusted by the third correction factors may be used by, an error correction component to cancel, within the error correction component the reflection signal to generate a residual reflection signal. The ToA of the reflection signal may be determined from the residual reflection signal, or from the third correction factors. At step 875 the third correction factors, or a signal adjusted according thereto, may be used to calculate a location of the cause of the reflection signal. For example, the ToA of the reflection signal, which may be a VSWR signal, may be compared to the ToA of an isolation leakage signal, or an isolation leakage residual signal, and the result of the comparison may be used to determine the location of a line break, or line fault along a waveguide that supplies a transmit signal to an antenna. Method 800 ends at step 865. It will be appreciated that after method 800 ends at step 865, application of third correction factors, or a third correction signal or third correction instructions derived therefrom may continue, or may be terminated, while application of first correction factors, signals, or instructions may continue to correct for power amplifier distortion via operation of a DPD function. In an embodiment, there may also be an operational desire to no longer measure VSWR or to determine distance to fault (through ToA measurements), in which case signal path selection component 51 may change to a configuration where signals from port c of circulator 50 are directed to receive path 56.

Figure 9:
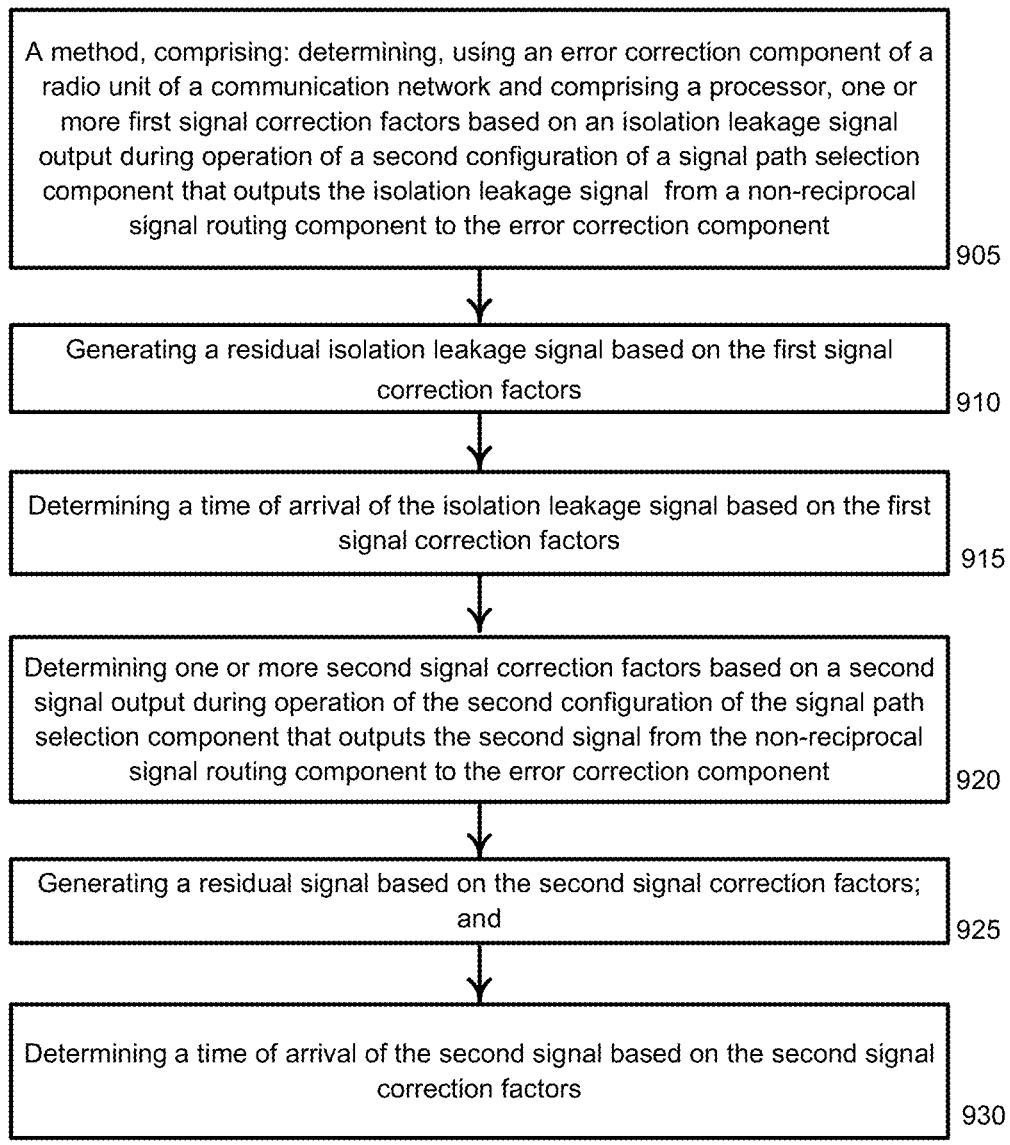
FIG. 9 illustrates a high-level block diagram of a method embodiment.

Turning now to FIG. 9, the figure illustrates a high-level block diagram of a method embodiment 900. In block 905, a method, comprises: determining, using an error correction component of a radio unit of a communication network and comprising a processor, one or more first signal correction factors based on an isolation leakage signal output during operation of a second configuration of a signal path selection component that outputs the isolation leakage signal from a non-reciprocal signal routing component to the error correction component. The first signal correction factors may be determined by the processor of the error correction component controlling a first ΔTΘM function. At block 910 method 900 comprises generating a residual isolation leakage signal based on the first signal correction factors; at block 915 determining a time of arrival of the isolation leakage signal based on the first signal correction factors; at block 920 determining one or more second signal correction factors based on a second signal output during operation of the second configuration of the signal path selection component that outputs the second signal from the non-reciprocal signal routing component to the error correction component (the second signal correction factors may be determined by the processor of the error correction component controlling a second ΔTΘM function); at block 925 generating a residual signal based on the second signal correction factors; and at block 930 determining a time of arrival of the second signal based on the second signal correction factors. A time of arrival may be based on time and phase determinations within a ΔTΘM function (i.e., ΔT and ΔΘ determinations) and matching of the magnitude may be a AM determination within the ΔTΘM function. The magnitude may be determinable from a AM component function and other registers of the ΔTΘM function.

Figure 10:
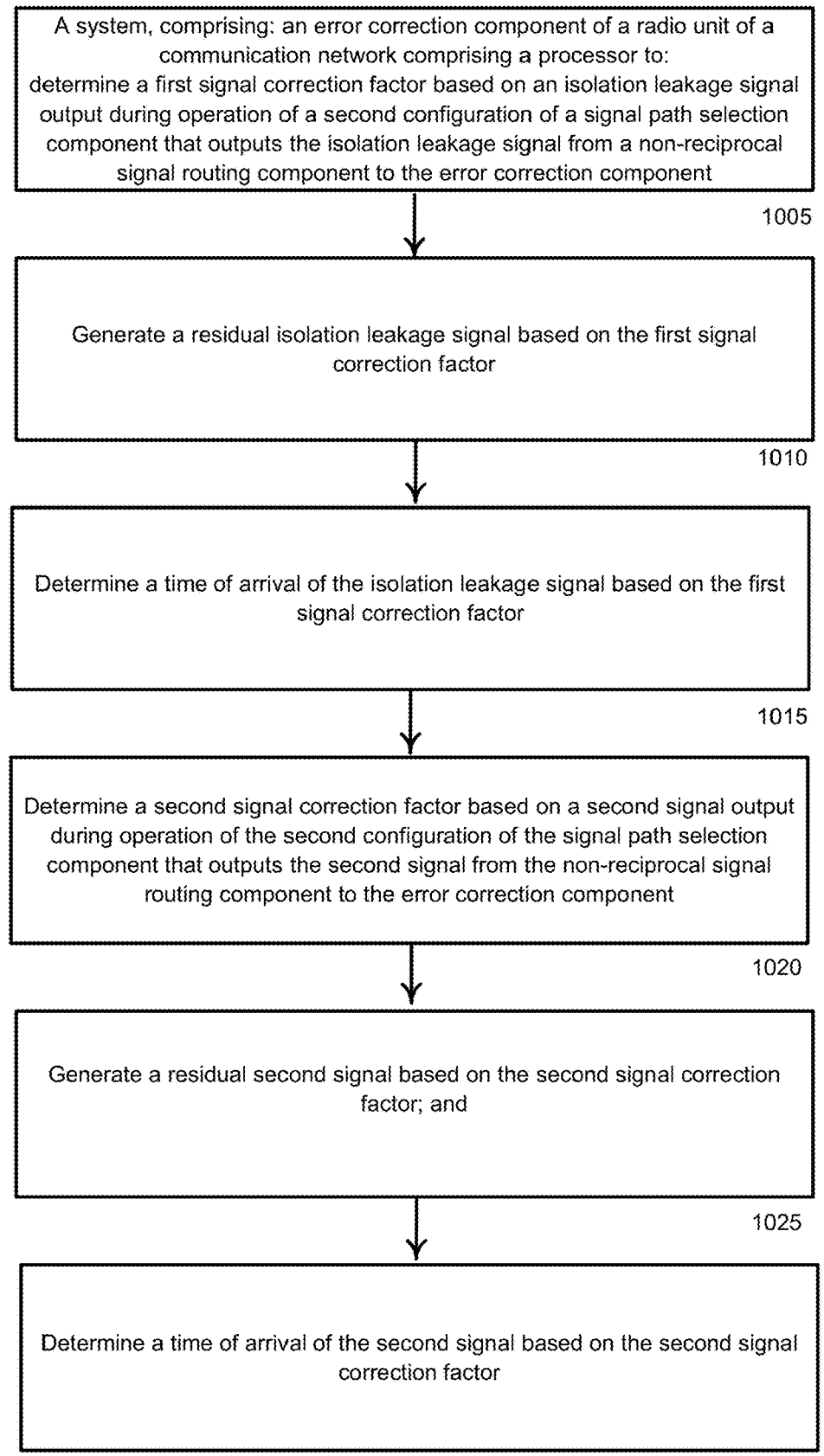
FIG. 10 illustrates a high-level block diagram of a system embodiment.

Turning now to FIG. 10, the figure illustrates a high-level block diagram of a system embodiment 1000. At block 1005, system 1000 comprises an error correction component of a radio unit of a communication network comprising a processor to: determine a first signal correction factor based on an isolation leakage signal output during operation of a second configuration of a signal path selection component that outputs the isolation leakage signal from a non-reciprocal signal routing component to the error correction component. The first signal correction factor may be determined by the processor of the error correction component controlling a first ΔTΘM function. At block 1010 method 1000 the processor is to generate a residual isolation leakage signal based on the first signal correction factor; at block 1015 determine a time of arrival of the isolation leakage signal based on the first signal correction factor; at block 1020 determine a second signal correction factor based on a second signal output during operation of the second configuration of the signal path selection component that outputs the second signal from the non-reciprocal signal routing component to the error correction component (the second signal correction factor may be determined by the processor of the error correction component controlling a second ΔTΘM function); at block 1025 generate a residual second signal based on the second signal correction factor; and at block 1030 determine a time of arrival of the second signal based on the second signal correction factor.

Figure 11:
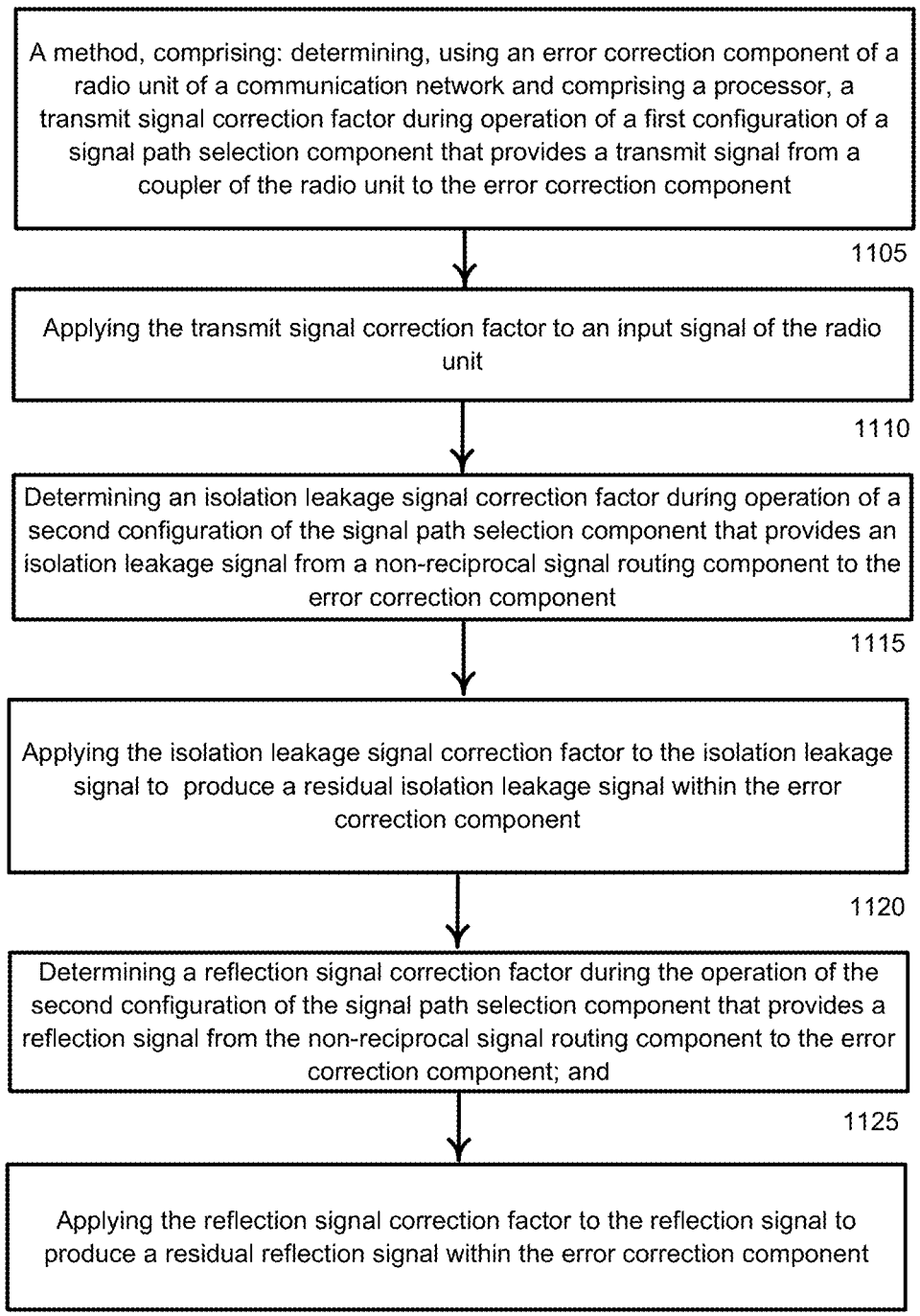
FIG. 11 illustrates a high-level diagram of a method embodiment.

Turning now to FIG. 11, the figure illustrates a high-level diagram of a method embodiment 1100, at block 1105 comprising: determining, using an error correction component of a radio unit of a communication network and comprising a processor, a transmit signal correction factor during operation of a first configuration of a signal path selection component that provides a transmit signal from a coupler of the radio unit to the error correction component; at block 1110 applying the transmit signal correction factor to an input signal of the radio unit (in an embodiment by the error correction component or in another embodiment by a ΔTΘM function); at block 1115 determining an isolation leakage signal correction factor during operation of a second configuration of the signal path selection component that provides an isolation leakage signal from a non-reciprocal signal routing component to the error correction component; at block 1120 applying the isolation leakage signal correction factor to the isolation leakage signal to produce a residual isolation leakage signal within the error correction component; at block 1125 determining a reflection signal correction factor during the operation of the second configuration of the signal path selection component that provides a reflection signal from the non-reciprocal signal routing component to the error correction component; and at block 1130 applying the reflection signal correction factor to the reflection signal to produce a residual reflection signal within the error correction component.

Turning now to FIG. 12, the figure illustrates a high-level block diagram of an embodiment 1200, which may be an embodiment of the system embodiment 1000 described in reference to FIG. 10, comprising at block 1205 a first ΔTΘM function and a second ΔTΘM function, wherein the first signal correction factor is stored, or retrieved from, in a memory corresponding to the first ΔTΘM function, and may be applied to adjust a signal provided from the first ΔTΘM function to the error correction component, and the second signal correction factor is stored in, or retrieved from, a memory corresponding to the second ΔTΘM function, and may be applied to adjust a signal provided from the second ΔTΘM function to the error correction component, wherein the error correction component processor is further to: at block 1210 retrieve the first and second signal correction factors, or retrieve first and second respective signals adjusted according to the first or second signal correction actors, from the first ΔTΘM function and the second ΔTΘM function, respectively, to determine the time of arrival of the isolation leakage signal based on the first signal correction factor and to determine the time of arrival of the second signal based on the second signal correction factor, respectively.

At block 1215 system 1200 may comprise wherein the second signal is a reflection signal and wherein a line fault caused the reflection signal at a line fault location that corresponds to the time of arrival of the residual second signal, wherein the error correction component processor is further to: determine the line fault location based on the time of arrival of the second signal.

At block 1220 system 1200 may comprise wherein the second signal is a reflection signal and wherein a line fault caused the reflection signal at a line fault location that corresponds to the time of arrival of the residual second signal, wherein the error correction component processor is further to: determine the line fault location based on the time of arrival of the second signal and determine the nature of the fault based on an amplitude of the second signal that corresponds to the second signal correction factor.

Turning now to FIG. 13, the figure illustrates a high-level block diagram of a method embodiment 1300, which may be an embodiment of system 1100 described in reference to FIG. 11, comprising at block 1305 wherein the transmit signal correction factor is stored in a memory corresponding to a first ΔTΘM function, wherein the isolation leakage signal correction factor is stored in a memory corresponding to a second error ΔTΘM function, and wherein the reflection signal correction factor is stored in a memory corresponding to a third ΔTΘM function, at block 1310 evaluating the reflection signal correction factor stored in the memory corresponding to the third ΔTΘM function; at block 1315 determining a time of arrival of the reflection signal based on the evaluation of the reflection signal correction factor; and at block 1320 determining a characteristic corresponding to the reflection signal based on the reflection signal correction factor. At block 1325 method 1300 may comprise wherein the reflection signal correction factor is used to determine a time of arrival of the reflection signal, the reflection signal time of arrival being used to determine the characteristic corresponding to the reflection signal that is a location of a fault corresponding to a waveguide that couples the non-reciprocal signal routing component and an antenna.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

Method steps may be embodied in computer software, firmware, or hardware, and may be implemented by computer code stored on computer readable media.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time, priority, sequence of operation, or preference. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

determining, using an error correction component of a radio unit of a communication network and comprising a processor, one or more first signal correction factors based on an isolation leakage signal output during operation of a configuration of a signal path selection component that outputs the isolation leakage signal from a non-reciprocal signal routing component to the error correction component;

generating a residual isolation leakage signal based on the first signal correction factors;

determining a first time of arrival of the isolation leakage signal based on the first signal correction factors;

determining, using the error correction component, one or more second signal correction factors based on a second signal that is output during operation of the configuration of the signal path selection component that outputs the second signal from the non-reciprocal signal routing component to the error correction component;

generating a second signal residual signal based on the second signal correction factors; and determining a second signal time of arrival of the second signal based on the second signal correction factors, wherein the determining of the first time of arrival of the isolation leakage signal based on the first signal correction factors and the determining of the second time of arrival of the second signal based on the second signal correction factors comprises determining a first residual time of arrival of the residual isolation leakage signal and determining a second residual time of arrival of the second signal residual signal, respectively, wherein the second signal is a reflection signal, and wherein a line fault that caused the reflection signal corresponds to the second residual time of arrival of the second signal residual signal relative to the first residual time of arrival of the residual isolation leakage signal.

2. The method of claim 1, wherein the non-reciprocal signal routing component comprises a circulator and wherein the isolation leakage signal is an isolation leakage signal of the circulator.

3. The method of claim 1, further comprising applying the first signal correction factors to the isolation leakage signal without applying the first signal correction factors to a signal to be transmitted by the radio unit;

wherein the isolation leakage signal comprises leakage of a transmit signal through the non-reciprocal signal routing component, and wherein the applying the one or more first signal correction factors within the error correction component creates a residual isolation leakage signal.

4. The method of claim 3, wherein the residual isolation leakage signal is evaluated within the error correction component to determine the first time of arrival of the isolation leakage signal.

5. The method of claim 1, further comprising:

receiving, via the signal path selection component, the isolation leakage signal from the non-reciprocal signal routing component.

6. The method of claim 1, wherein the isolation leakage signal comprises leakage of a transmit signal through the non-reciprocal signal routing component, wherein the first signal correction factors are applied within the error correction component to generate the residual isolation leakage signal, and wherein the method further comprises:

evaluating the residual isolation leakage signal within the error correction component to determine the Time of Arrival of the residual isolation leakage signal relative to a time of transmitting the transmit signal from the non-reciprocal signal routing component.

7. The method of claim 1, further comprising:

determining a degradation of the non-reciprocal signal routing component based on the first residual time of arrival of the residual isolation leakage signal.

8. A system, comprising:

an error correction component of a radio unit of a communication network comprising a processor to:

determine a first signal correction factor based on an isolation leakage signal output during operation of a configuration of a signal path selection component that outputs the isolation leakage signal from a non-reciprocal signal routing component to the error correction component;

generate a residual isolation leakage signal based on the first signal correction factor;

determine a first time of arrival of the isolation leakage signal based on the first signal correction factor;

determine a second signal correction factor based on a second signal that is output during operation of the configuration of the signal path selection component that outputs the second signal from the non-reciprocal signal routing component to the error correction component;

generate a residual second signal based on the second signal correction factor; and determine a second time of arrival of the second signal based on the second signal correction factor, wherein the isolation leakage signal comprises leakage of a transmit signal through the non-reciprocal signal routing component, wherein the first signal correction factor is applied within the error correction component to generate the residual isolation leakage signal, and wherein the processor is further to:

evaluate the residual isolation leakage signal within the error correction component to determine the first time of arrival of the residual isolation leakage signal relative to a time of transmitting the transmit signal from the non-reciprocal signal routing component.

9. The system of claim 8, further comprising:

a first Difference in Time, Phase, or Magnitude ("$\Delta T\Theta M$") function and a second $\Delta T\Theta M$ function, wherein the first signal correction factor is stored in a memory corresponding to the first $\Delta T\Theta M$ function and the second signal correction factor is stored in a memory corresponding to the second $\Delta T\Theta M$ function, wherein the error correction component processor is further to:

retrieve the first and second signal correction factors from the first $\Delta T\Theta M$ function and the second $\Delta T\Theta M$ function, respectively, to determine the first time of arrival of the isolation leakage signal based on the first signal correction factor and to determine the second time of arrival of the second signal based on the second signal correction factor, respectively.

10. The system of claim 9, wherein the second signal is a reflection signal, wherein a line fault caused the reflection signal at a line fault location that corresponds to the time of arrival of the residual second signal, and wherein the error correction component processor is further to: determine the line fault location based on the second time of arrival of the second signal.

11. The system of claim 10, wherein the second signal is a reflection signal, wherein a line fault caused the reflection signal at a line fault location that corresponds to the time of arrival of the residual second signal, and wherein the error correction component processor is further to: determine the line fault location based on the second time of arrival of the second signal and determine the nature of the fault based on an amplitude of the second signal that corresponds to the second signal correction factor.

12. The system of claim 9, wherein the signal path selection component comprises a first switch and a second switch, wherein the first switch comprises a first input and a first output that provides signals to be provided to a third input of the error correction component, and wherein the second switch comprises a second input and a second output that couples to a fourth input of the first switch.

13. The system of claim 8, further comprising a coupler, wherein the error correction component processor is further to:

determine a transmit signal correction factor based on a first error compensation function, usable during a first configuration of the signal path selection component that provides a transmit signal from the coupler to the error correction component, wherein the configuration of the signal path selection component that outputs the second signal from the non-reciprocal signal routing component to the error correction component is a second configuration of the signal path selection component;

apply the transmit signal correction factor to an input signal of the radio unit;

determine the first signal correction factor based on the second error compensation function, usable during the second configuration of the signal path selection component that provides the isolation leakage signal from the non-reciprocal signal routing component to the error correction component;

apply the first signal correction factor to the isolation leakage signal without applying the first signal correction factor to an input signal of the radio unit; and determine a second signal residual time of arrival of a residual second signal that remains after the first signal correction factor has been applied to the isolation leakage signal within the error correction component.

14. A method, comprising:

determining, using an error correction component of a radio unit of a communication network and comprising a processor, a transmit signal correction factor during operation of a first configuration of a signal path selection component that provides a transmit signal from a coupler of the radio unit to the error correction component;

applying the transmit signal correction factor to an input signal of the radio unit;

determining an isolation leakage signal correction factor during operation of a second configuration of the signal path selection component that provides an isolation leakage signal from a non-reciprocal signal routing component to the error correction component;

applying the isolation leakage signal correction factor to the isolation leakage signal to produce a residual isolation leakage signal within the error correction component;

determining a reflection signal correction factor during the operation of the second configuration of the signal path selection component that provides a reflection signal from the non-reciprocal signal routing component to the error correction component; and applying the reflection signal correction factor to the reflection signal to produce a residual reflection signal within the error correction component.

15. The method of claim 14, wherein the transmit signal correction factor is stored in a memory corresponding to a first Difference in Time, Phase, or Magnitude ("$\Delta T\Theta M$") function, wherein the isolation leakage signal correction factor is stored in a memory corresponding to a second $\Delta T\Theta M$ function, and wherein the reflection signal correction factor is stored in a memory corresponding to a third $\Delta T\Theta M$ function.

16. The method of claim 15, further comprising:

evaluating the reflection signal correction factor stored in the memory corresponding to the third $\Delta T\Theta M$ function;

determining a time of arrival of the reflection signal based on the evaluation of the reflection signal correction factor; and determining a characteristic corresponding to the reflection signal based on the reflection signal correction factor.

17. The method of claim 16, wherein the reflection signal is a voltage standing wave ratio signal.

18. The method of claim 16, wherein the reflection signal correction factor is used to determine a time of arrival of the reflection signal, the reflection signal time of arrival being used to determine the characteristic corresponding to the reflection signal that is a location of a fault corresponding to a waveguide that couples the non-reciprocal signal routing component and an antenna.

19. The method of claim 16, wherein the reflection signal correction factor is used to determine a time of arrival and an amplitude of the reflection signal, the reflection signal time of arrival and amplitude being used to determine the characteristic corresponding to the reflection signal, and wherein the characteristic corresponds to a cause of a fault corresponding to a waveguide that couples the non-reciprocal signal routing component and an antenna.

20. The method of claim 14, wherein the isolation leakage signal and the reflection signal are provided from a port of the non-reciprocal signal routing component that is used to provide receive signals from an antenna to a receive path of the radio unit.

* * * * *